United States Patent
Chai et al.

(10) Patent No.: US 8,924,084 B2
(45) Date of Patent: Dec. 30, 2014

(54) STEERING CONTROL APPARATUS AND STEERING CONTROL METHOD

(71) Applicant: Nissan Motor Co., Ltd., Yokohama-shi, Kanagawa (JP)

(72) Inventors: Yu wun Chai, Isehara (JP); Takaaki Eguchi, Yokohama (JP); Yukinobu Matsushita, Isehara (JP); Kazuhiro Igarashi, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/354,224

(22) PCT Filed: Oct. 22, 2012

(86) PCT No.: PCT/JP2012/006755
§ 371 (c)(1),
(2), (4) Date: Apr. 25, 2014

(87) PCT Pub. No.: WO2013/061566
PCT Pub. Date: May 2, 2013

(65) Prior Publication Data
US 2014/0316658 A1    Oct. 23, 2014

(30) Foreign Application Priority Data

Oct. 26, 2011 (JP) .................. 2011-235240
Dec. 14, 2011 (JP) .................. 2011-273038

(51) Int. Cl.
*B62D 6/00* (2006.01)
*B62D 6/04* (2006.01)

(52) U.S. Cl.
CPC ........................... *B62D 6/04* (2013.01)
USPC .............................. 701/42; 701/41

(58) Field of Classification Search
USPC ............. 701/42, 41; 180/403, 422, 432, 402, 180/441, 405, 443
See application file for complete search history.

(56) References Cited

U.S. PATENT DOCUMENTS

2009/0171526 A1 * 7/2009 Takenaka et al. ............... 701/29
2009/0319114 A1 * 12/2009 Takenaka et al. ............... 701/29

FOREIGN PATENT DOCUMENTS

| JP | 2000108914 A | 4/2000 |
| JP | 2008230539 A | 10/2008 |
| JP | 2009113729 A | 5/2009 |

* cited by examiner

*Primary Examiner* — Marthe Marc-Coleman
(74) *Attorney, Agent, or Firm* — Young Basile

(57) ABSTRACT

A control computing unit allocates a feedback axial force and a feedforward axial force at an allocation ratio based on an axial force difference which is a difference between the feedback axial force and the feedforward axial force to set a final axial force as a steering-rack axial force. The control computing unit drives a reaction force motor on the basis of the set final axial force.

11 Claims, 11 Drawing Sheets

STEERING CONTROL APPARATUS AND STEERING CONTROL METHOD

CROSS REFERENCE TO RELATED APPLICATION

The present application claims priority to Japanese Patent Application Nos. 2011-235240, filed Oct. 26, 2011 and 2011-273038, filed Dec. 14, 2011, each incorporated herein in its entirety.

TECHNICAL FIELD

The present invention relates to a steer-by-wire type steering control apparatus in which a steering wheel is mechanically separated from wheels to be steered.

BACKGROUND

In the related art, for example, a technique described in Japanese Patent Application Laid-Open No. 2000-108914 is known as a technique of a steering control apparatus.

In the technique according to the related art, a control amount of a reaction force motor is calculated by adding a control amount of a steering reaction force based on a yaw rate to a control amount of the steering reaction force based on a steering wheel angle. Accordingly, in the technique according to the related art, a force (hereinafter, also referred to as a tire transverse force) acting on a tire in the transverse direction is reflected in the steering reaction force.

SUMMARY

However, in the technique according to the related art, the control amount of the reaction force motor is calculated by adding the control amount of the steering reaction force based on the yaw rate to the control amount of the steering reaction force based on the steering wheel angle. Therefore, in the technique according to the related art, for example, when accuracy of the control amount of the steering reaction force based on the steering wheel angle decreases, there is a possibility that the steering reaction force will be inappropriate.

The present invention is made in view of the above-mentioned circumstances and an object thereof is to apply a more appropriate steering reaction force.

In order to achieve the above-mentioned object, according to an aspect of the present invention, a feedback axial force and a feedforward axial force are allocated at an allocation ratio based on an axial force difference which is a difference between the feedback axial force and the feedforward axial force, and a final axial force which is a steering-rack axial force is set. According to the aspect of the present invention, a reaction force motor is driven on the basis of the set final axial force.

DETAILED DESCRIPTION OF EMBODIMENTS

Hereinafter, embodiments of the present invention will be described with reference to the accompanying drawings.

(First Embodiment)

A vehicle A according to this embodiment is a vehicle including a so-called steer-by-wire type (SBW type) steering control apparatus in which a steering wheel 1 is mechanically separated from front wheels to be steered (hereinafter, referred to as steered wheels 2).

Figure 1:
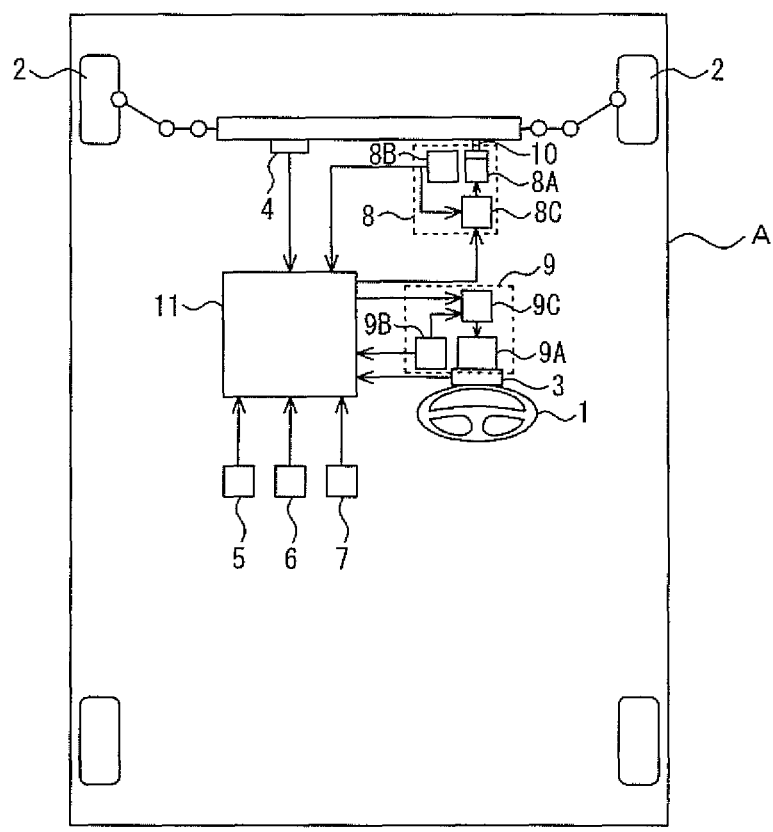
FIG. 1 is a conceptual diagram illustrating a configuration of a vehicle A.

FIG. 1 is a conceptual diagram illustrating a configuration of the vehicle A according to this embodiment. As illustrated in FIG. 1, the vehicle A includes a steering wheel angle sensor 3, a steering angle sensor 4, a vehicle speed sensor 5, a transverse G sensor 6, and a yaw rate sensor 7.

The steering wheel angle sensor 3 detects a steering wheel angle δ of the steering wheel 1. The steering wheel angle sensor 3 outputs a signal (hereinafter, also referred to as a detection signal) indicating the detection result to a control computing unit 11 to be described later. The steering angle sensor 4 detects a steering angle θ of the steered wheels 2. As a method of detecting the steering angle θ of the steered wheels 2, a calculation method based on a rack shift of a steering rack can be employed. The steering angle sensor 4 outputs a detection signal to the control computing unit 11. The vehicle speed sensor 5 detects a vehicle speed V of the vehicle A. The vehicle speed sensor 5 outputs a detection signal to the control computing unit 11.

The transverse G sensor 6 detects a transverse acceleration Gy of the vehicle A. The transverse G sensor 6 outputs a detection signal to the control computing unit 11. The yaw rate sensor 7 detects a yaw rate γ of the vehicle A. The yaw rate sensor 7 outputs a detection signal to the control computing unit 11. The transverse G sensor 6 and the yaw rate sensor 7 are disposed on a spring (vehicle body).

The vehicle A includes a steering control unit 8 and a reaction force control unit 9. The steering control unit 8 includes a steering motor 8A, a steering current detecting unit 8B, and a steering motor drive unit 8C. The steering motor 8A is coupled to a pinion shaft 10 via a reduction gear. The steering motor 8A is driven by the steering motor drive unit 8C and moves the steering rack in the lateral direction via the pinion shaft 10. Accordingly, the steering motor 8A steers the steered wheels 2. As a method of driving the steering motor 8A, a method of controlling a current (hereinafter, also referred to as a steering current) for driving the steering motor 8A can be employed.

The steering current detecting unit 8B detects a steering current. The steering current detecting unit 8B outputs a detection signal to the steering motor drive unit 8C and the control computing unit 11. The steering motor drive unit 8C controls the steering current of the steering motor 8A on the basis of a target steering current calculated by the control computing unit 11 so that the steering current detected by the steering current detecting unit 8B coincides with the target steering current. Accordingly, the steering motor drive unit 8C drives the steering motor 8A. The target steering current is a target value of the current for driving the steering motor 8A.

The reaction force control unit 9 includes a reaction force motor 9A, a reaction force current detecting unit 9B, and a reaction force motor drive unit 9C. The reaction force motor 9A is coupled to the steering shaft via a reduction gear. The reaction force motor 9A is drive by the reaction force motor drive unit 9C and applies a rotary torque to the steering wheel 1 via the steering shaft. Accordingly, the reaction force motor 9A generates a steering reaction force. As a method of driving the reaction force motor 9A, a method of controlling a current (hereinafter, also referred to as a reaction force current) for driving the reaction force motor 9A can be employed.

The reaction force current detecting unit 9B detects the reaction force current. The reaction force current detecting unit 9B outputs a detection signal to the reaction force motor drive unit 9C and the control computing unit 11.

The reaction force motor drive unit 9C controls the reaction force current of the reaction force motor 9A on the basis of a target reaction force current calculated by the control computing unit 11 so that the reaction force current detected by the reaction force current detecting unit 9B coincides with the target reaction force current. Accordingly, the reaction force motor drive unit 9C drives the reaction force motor 9A. The target reaction force current is a target value of a current for driving the reaction force motor 9A. The vehicle A includes the control computing unit 11.

Figure 2:
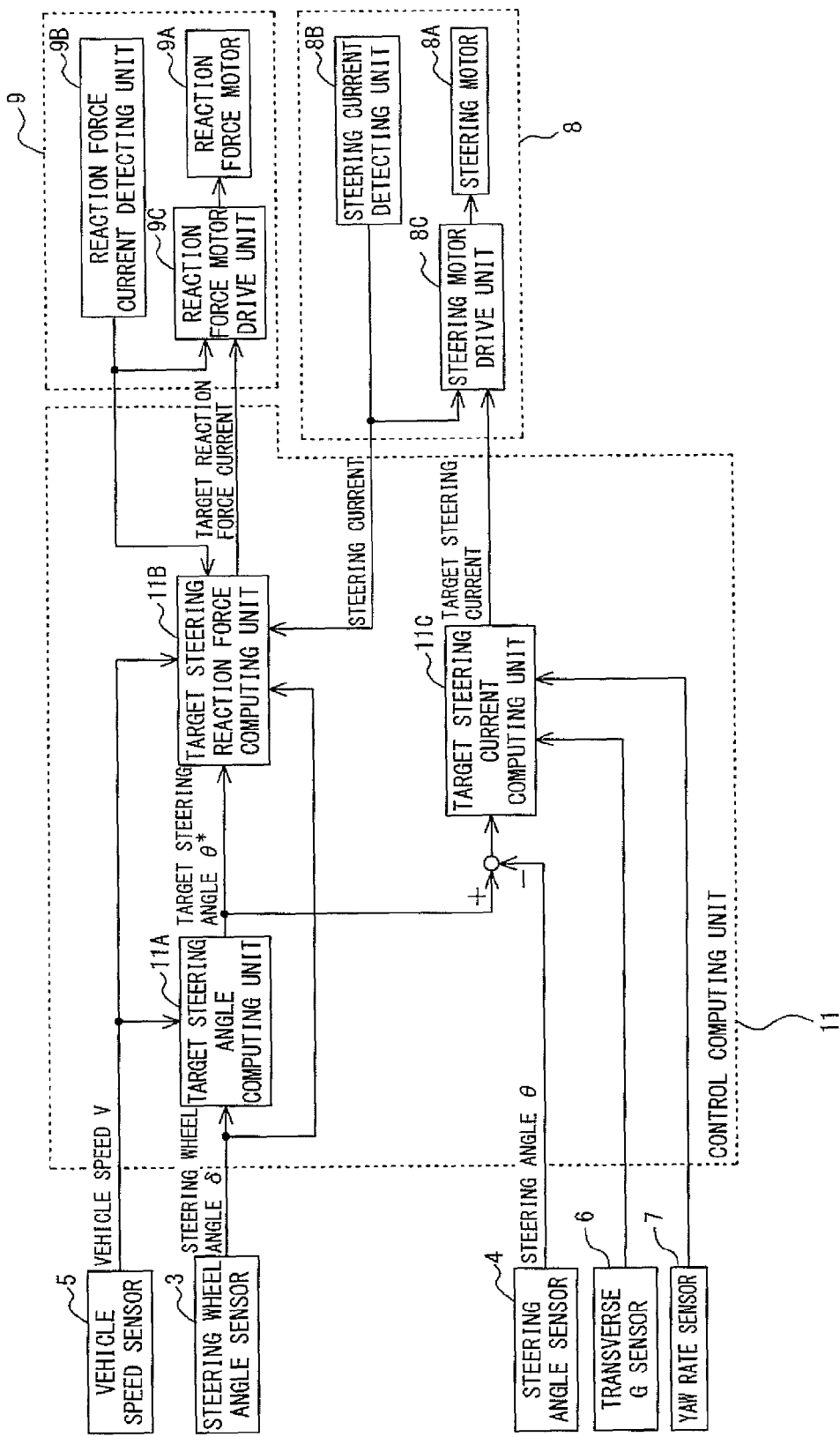
FIG. 2 is a block diagram illustrating a configuration of a control computing unit 11.

FIG. 2 is a block diagram illustrating the configuration of the control computing unit 11. As illustrated in FIG. 2, the control computing unit 11 includes a target steering angle computing unit 11A, a target steering reaction force computing unit 11B, and a target steering current computing unit 11C.

The target steering angle computing unit 11A calculates a target steering angle θ* which is a target value of the steering angle θ on the basis of the steering wheel angle δ detected by the steering wheel angle sensor 3 and the vehicle speed V detected by the vehicle speed sensor 5. The target steering angle computing unit 11A outputs the calculation result to the target steering reaction force computing unit 11B.

The target steering reaction force computing unit 11B calculates the target reaction force current on the basis of the target steering angle θ* calculated by the target steering angle computing unit 11A, the vehicle speed V detected by the vehicle speed sensor 5, and the steering current detected by the steering current detecting unit 8B. The target steering reaction force computing unit 11B outputs the calculation result to the reaction force control unit 9 (the reaction force motor drive unit 9C).

Figure 3:
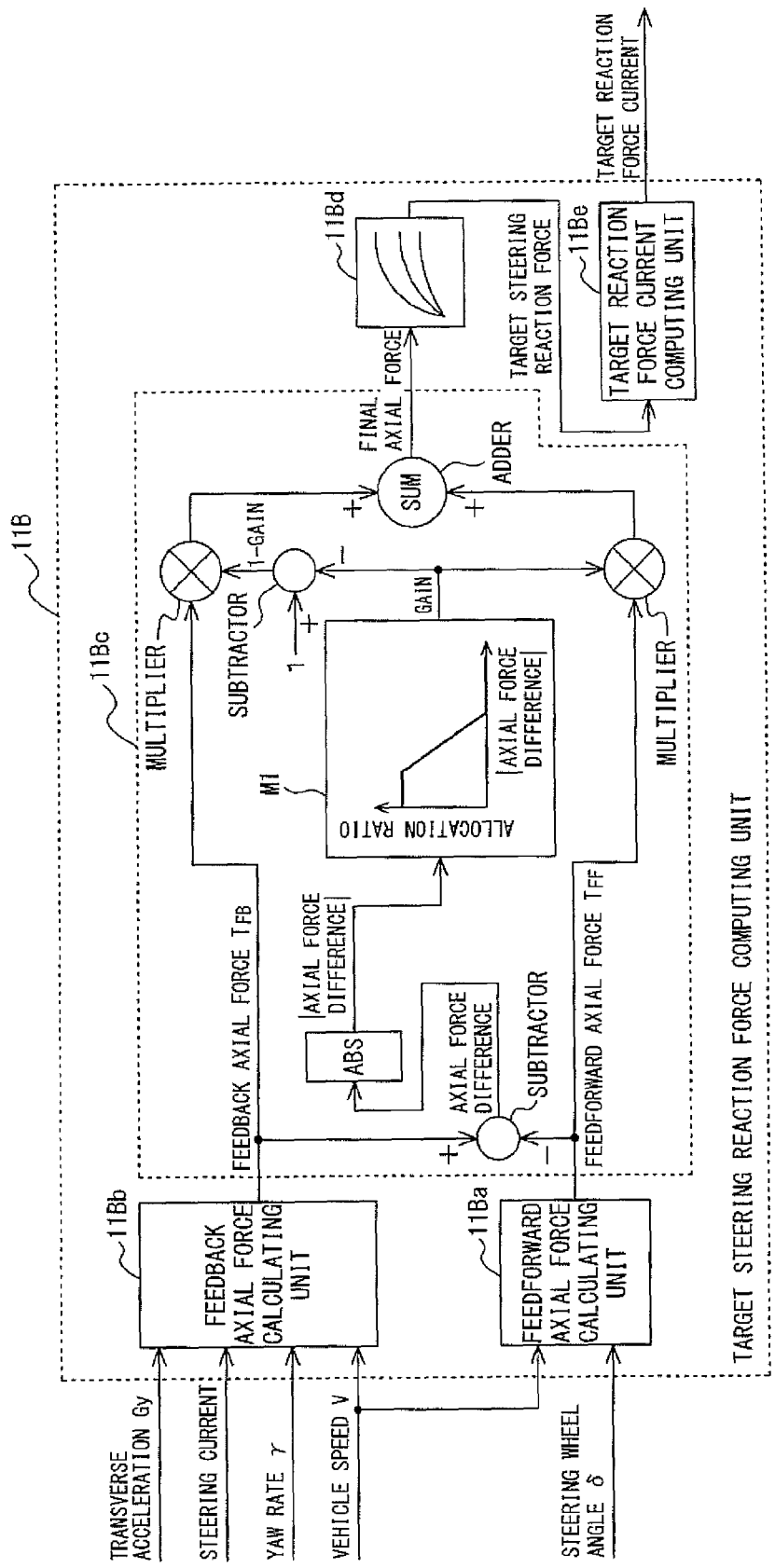
FIG. 3 is a block diagram illustrating a detailed configuration of a target steering reaction force computing unit 11B.

FIG. 3 is a block diagram illustrating the detailed configuration of the target steering reaction force computing unit 11B. The detailed configuration of the target steering reaction force computing unit 11B will be described below.

As illustrated in FIG. 3, the target steering reaction force computing unit 11B includes a feedforward axial force calculating unit 11Ba, a feedback axial force calculating unit 11Bb, a final axial force calculating unit 11Bc, an axial force-steering reaction force conversion unit 11Bd, and a target reaction force current computing unit 11Be.

The feedforward axial force calculating unit 11Ba calculates a steering-rack axial force (hereinafter, also referred to as a feedforward axial force) $T_{FF}$ according to a formula (1) on the basis of the steering wheel angle δ detected by the steering wheel angle sensor 3 and the vehicle speed V detected by the vehicle speed sensor 5. The steering-rack axial force is a rack axial force which is applied to the steering rack. The feedforward axial force calculating unit 11Ba outputs the calculation result to the final axial force calculating unit 11Bc.

$$T_{FF}=(Ks+Css)/(JrS^2+(Cr+Cs)s+Ks)\cdot k\cdot V/(1+A\cdot V^2)\cdot \theta + Ks(Jrs^2+Crs)/(JrS^2+(Cr+Cs)s+Ks)\cdot \theta \quad (1)$$

Figure 4:
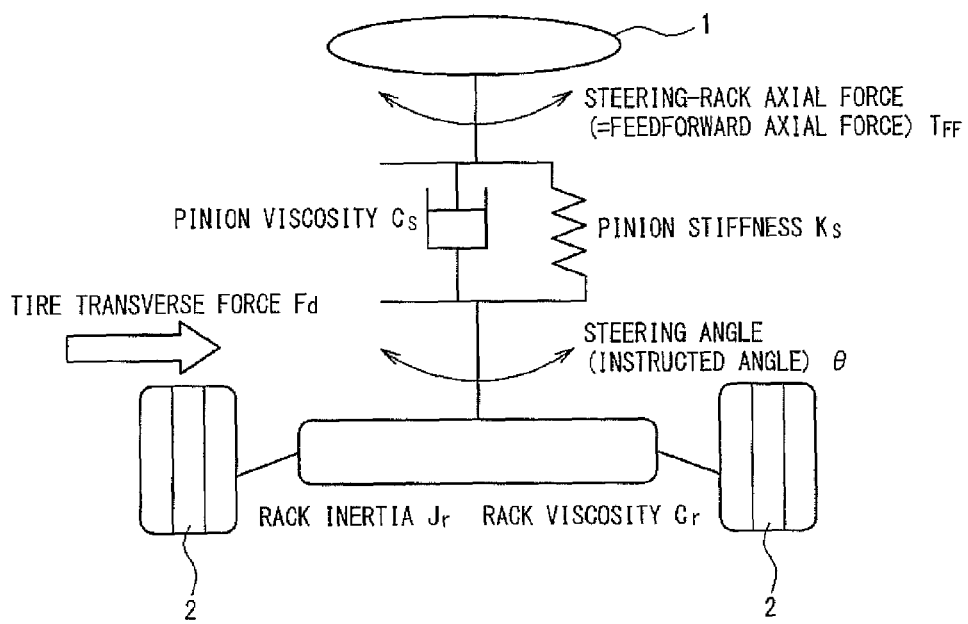
FIG. 4 is a diagram illustrating coefficients of a calculating formula for a feedforward axial force $T_{FF}$.

Here, as illustrated in FIG. 4, Ks represents pinion stiffness, Cs represents pinion viscosity, Jr represents rack inertia, Cr represents rack viscosity, and k and A are predetermined constants. Accordingly, the feedforward axial force calculating unit 11Ba calculates a steering-rack axial force not reflecting a tire transverse force Fd acting on the steered wheels 2 as the feedforward axial force $T_{FF}$.

Here, the formula (1) is a mathematical formula derived on the basis of a motion equation of a vehicle including a steering mechanism in which the steering wheel 1 and the steered wheels 2 are mechanically coupled to each other in a predetermined road surface state or a predetermined vehicle state. The first term of the right side of the formula (1) is a term representing a component based on the steering wheel angle δ and the vehicle speed V out of components of the feedforward axial force $T_{FF}$ and the second term of the right side is a term representing a component based on a steering wheel angular velocity dδ. A term representing a component based on a steering wheel angular acceleration is excluded from the formula (1), because the term includes a lot of noise components and causes vibration of the calculation result of the feedforward axial force $T_{FF}$.

The feedback axial force calculating unit 11Bb calculates a steering-rack axial force (hereinafter, also referred to as a transverse-G axial force) according to a formula (2) on the basis of the transverse acceleration Gy (state quantity of the vehicle A) detected by the transverse G sensor 6. In the formula (2), a front wheel road and the transverse acceleration Gy are first multiplied and the multiplication result is calculated as an axial force (force in the axis direction) applied to the steered wheels 2. Subsequently, in the formula (2), the calculated axial force applied to the steered wheels 2 is multiplied by a constant (hereinafter, also referred to as a link ratio) based on an angle of a link or a suspension and the multiplication result is calculated as the transverse-G axial force.

Transverse-G axial force=axial force applied to steered wheels 2×link ratio (2)

Figure 5:
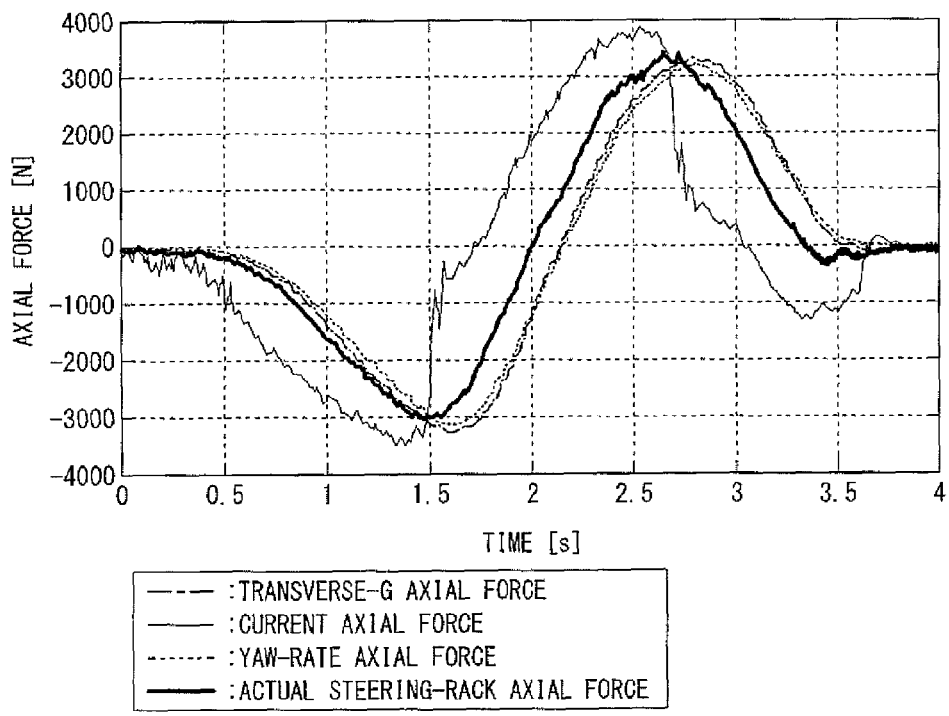
FIG. 5 is a graph illustrating a transverse-G axial force, a current axial force, a yaw-rate axial force, and an actual steering-rack axial force.

Axial force applied to steered wheels 2=front wheel load×transverse acceleration Gy Here, the transverse acceleration Gy is generated by steering the steered wheels 2, applying the tire transverse force Fd to the steered wheels 2, and turning the vehicle A. Accordingly, the feedback axial force calculating unit 11Bb can calculate the steering-rack axial force (transverse-G axial force) reflecting the influence of the tire transverse force Fd acting on the steered wheels 2 on the basis of the transverse acceleration Gy. Here, since the transverse G sensor 6 is disposed on a spring (vehicle body), the detection of the transverse acceleration Gy delays. Accordingly, as illustrated in FIG. 5, the phase of the transverse-G axial force is later than that of the actual steering-rack axial force.

In this embodiment, an example where the transverse acceleration Gy detected by the transverse G sensor 6 is used to calculate the transverse-G axial force, but other configurations may be employed. For example, a configuration in which the vehicle speed V detected by the vehicle speed sensor 5 is multiplied by the yaw rate γ detected by the yaw rate sensor 7 and the multiplication result γ×V is used instead of the transverse acceleration Gy may be employed.

Referring to FIG. 3 again, the feedback axial force calculating unit 11Bb calculates a steering-rack axial force (hereinafter, also referred to as a current axial force) according to a formula (3) on the basis of the steering current (state quantity of the vehicle A) detected by the steering current detecting unit 8B. In the formula (3), first, the steering current, a torque constant (Nm/A) for calculating an output torque of the steering motor 8A on the basis of the steering current, and a motor gear ratio for transmitting a motor torque of the steering motor 8A are multiplied. Subsequently, in the formula (3), the multiplication result is divided by a pinion radius (m) of a pinion gear of the steering motor 8A, the division result is multiplied by efficiency for transmitting the output torque of the steering motor 8A, and the multiplication result is calculated as the current axial force.

Current axial force=steering current×motor gear ratio×torque constant(*Nm/A*)/pinion radius(*m*)× efficiency (3)

Here, the steering current varies by steering the steering wheel 1, changing the target steering angle θ*, and causing a difference between the target steering angle θ* and the actual steering angle θ. The steering current also varies by steering the steered wheels 2, applying the tire transverse force Fd to the steered wheels 2, and causing a difference between the target steering angle θ* and the actual steering angle θ. The steering current also varies by applying road surface disturbance to the steered wheels 2 due to road surface unevenness or the like, applying the tire transverse force Fd to the steered wheels 2, and causing a difference between the target steering angle θ* and the actual steering angle θ. Therefore, the feedback axial force calculating unit 11Bb can calculate the steering-rack axial force (current axial force) reflecting the influence of the tire transverse force Fd acting on the steered wheels 2 on the basis of the steering current. Here, the current axial force is generated at the time point at which a difference is generated between the target steering angle θ* and the actual steering angle θ. Accordingly, as illustrated in FIG. 5, the phase of the current axial force is earlier than that of the actual steering-rack axial force or the actual transverse-G axial force.

Referring to FIG. 3 again, the feedback axial force calculating unit 11Bb calculates a steering-rack axial force (hereinafter, also referred to as a yaw-rate axial force) according to a formula (4) on the basis of the vehicle speed V detected by the vehicle speed sensor 5 and the yaw rate γ (state quantity of the vehicle A) detected by the yaw rate sensor 7. In the formula (4), first, the front wheel load, the vehicle speed V, and the yaw rate γ are multiplied and the multiplication result is calculated as the axial force applied to the steered wheels 2. Subsequently, in the formula (4), the calculated axial force applied to the steered wheels 2 is multiplied by the link ratio and the multiplication result is calculated as the yaw-rate axial force.

Yaw-rate axial force=axial force applied to steered wheels 2×link ratio (4)

Axial force applied to steered wheels 2=front wheel load×vehicle speed *V*×yaw rate γ

Here, the yaw rate γ is generated by steering the steered wheels 2, applying the tire transverse force Fd to the steered wheels 2, and turning the vehicle A. Therefore, the feedback axial force calculating unit 11Bb can calculate the steering-rack axial force (yaw-rate axial force) reflecting the influence of the tire transverse force Fd acting on the steered wheels 2 on the basis of the yaw rate γ. Here, since the yaw rate sensor 7 is disposed on the spring (vehicle body), the detection of the yaw rate γ delays. Accordingly, as illustrated FIG. 5, the phase of the yaw-rate axial force is later than that of the actual steering-rack axial force.

The feedback axial force calculating unit 11Bb calculates a steering-rack axial force (hereinafter, also referred to as a "feedback axial force") according to a formula (5) on the basis of the calculated transverse-G axial force, the calculated current axial force, and the calculated yaw-rate axial force. In the formula (5), the transverse-G axial force is multiplied by an allocation ratio $K_1$, the current axial force is multiplied by an allocation ratio $K_2$, the yaw-rate axial force is multiplied by an allocation ratio $K_3$, and the sum of the multiplication results is calculated as the feedback axial force $T_{FB}$. That is, the feedback axial force $T_{FB}$ is calculated on the basis of the value obtained by multiplying the transverse-G axial force by the allocation ratio $K_1$, the value obtained by multiplying the current axial force by the allocation ratio $K_2$, and the value obtained by multiplying the yaw-rate axial force by the allocation ratio $K_3$. The feedback axial force calculating unit 11Bb outputs the calculation result to the final axial force calculating unit 11Bc.

$T_{FB}$=transverse-*G* axial force×$K_1$+current axial force× $K_2$+yaw-rate axial force×$K_3$ (5)

Here, the allocation ratios $K_1$, $K_2$, and $K_3$ are allocation ratios of the transverse-G axial force, the current axial force, and the yaw-rate axial force, respectively. The magnitude relationship of the allocation ratios $K_1$, $K_2$, and $K_3$ is set to $K_1>K_2>K_3$. That is, the allocation ratios are set to be larger in the order of the transverse-G axial force, the current axial force, and the yaw-rate axial force. For example, the allocation ratios $K_1$, $K_2$, and $K_3$ are set to $K_1$=0.6, $K_2$=0.3, and $K_3$=0.1. Accordingly, the feedback axial force calculating unit 11Bb calculates the steering-rack axial force reflecting the influence of the tire transverse force Fd acting on the steered wheels 2 as the feedback axial force $T_{FB}$.

In this way, the feedback axial force calculating unit 11Bb according to this embodiment calculates the current axial force and the transverse-G axial force on the basis of the steering current of the steering motor 8A and the transverse acceleration Gy of the vehicle A, and calculates the feedback axial force $T_{FB}$ on the basis of the calculated current axial force and the transverse-G axial force. Therefore, the feedback axial force calculating unit 11Bb according to this embodiment can calculate the feedback axial force $T_{FB}$ on the basis of the detection results of the sensors (the steering current detecting unit 8B and the transverse G sensor 6) included in a general vehicle, such as the steering current of the steering motor 8A and the transverse acceleration Gy of the vehicle A. Accordingly, since the control computing unit 11 according to this embodiment drives the reaction force motor 9A on the basis of the feedback axial force $T_{FB}$, it is not necessary to include a dedicated sensor such as an axial force sensor for detecting the steering-rack axial force and it is thus possible to suppress an increase in the manufacturing cost.

Figure 6:
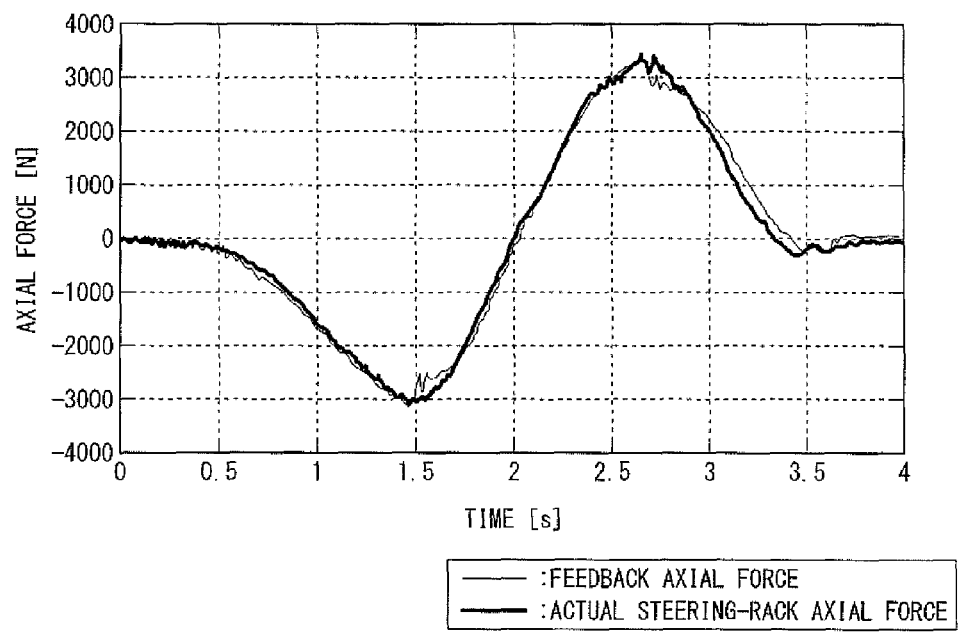
FIG. 6 is a graph illustrating a feedback axial force $T_{FB}$ and an actual steering-rack axial force.

The feedback axial force calculating unit 11Bb according to this embodiment calculates the feedback axial force $T_{FB}$ on the basis of the value obtained by multiplying the current axial force by the allocation ratio $K_2$ and the value obtained by multiplying the transverse-G axial force by the allocation ratio $K_1$. Here, as illustrated in FIG. 5, the phase of the transverse-G axial force is later than that of the actual steering-rack axial force. The phase of the current axial force is earlier than that of the actual steering-rack axial force. Therefore, the feedback axial force calculating unit 11Bb according to this embodiment can compensate for the phase delay due to the transverse-G axial force and can calculate a more appropriate feedback axial force $T_{FB}$ by adding the current axial force to the transverse-G axial force as illustrated in FIG. 6. Accordingly, the control computing unit 11 according to this embodiment can apply a more appropriate steering reaction force by driving the reaction force motor 9A on the basis of the feedback axial force $T_{FB}$.

Furthermore, the feedback axial force calculating unit 11Bb according to this embodiment calculates the feedback axial force $T_{FB}$ on the basis of a value obtained by multiplying the current axial force by the allocation ratio $K_2$ and a value obtained by multiplying the transverse-G axial force by the allocation ratio $K_1$. Here, when road surface disturbance due to road surface unevenness or the like acts on the steered wheels 2 of the vehicle A and a tire transverse force Fd acts on the steered wheels 2, a difference occurs between the target steering angle $\theta^*$ and the actual steering angle $\theta$. Therefore, the control computing unit 11 according to this embodiment can reflect the influence of the road surface disturbance acting on the steered wheels 2 due to the road surface unevenness or the like in the feedback axial force $T_{FB}$ by adding the current axial force to the transverse-G axial force and it is thus possible to calculate a more appropriate feedback axial force $T_{FB}$. Accordingly, the control computing unit 11 according to this embodiment can apply a more appropriate steering reaction force by driving the reaction force motor 9A on the basis of the feedback axial force $T_{FB}$.

The feedback axial force calculating unit 11Bb according to this embodiment sets the allocation ratio $K_1$ of the transverse-G axial force to be greater than the allocation ratio $K_2$ of the current axial force. Therefore, the feedback axial force calculating unit 11Bb according to this embodiment can reduce the allocation ratio of the current axial force and can suppress a decrease in estimation accuracy of the feedback axial force $T_{FB}$, for example, even when the estimation accuracy of the current axial force becomes lower than that of the actual steering-rack axial force due to an influence of inertia of the steering motor 8A or friction. Accordingly, the control computing unit 11 according to this embodiment can apply a more appropriate steering reaction force by driving the reaction force motor 9A on the basis of the feedback axial force $T_{FB}$.

Furthermore, the feedback axial force calculating unit 11Bb according to this embodiment calculates the feedback axial force $T_{FB}$ on the basis of a value obtained by multiplying the current axial force by the allocation ratio $K_2$, a value obtained by multiplying the transverse-G axial force by the allocation ratio $K_1$, and a value obtained by multiplying the yaw-rate axial force by the allocation ratio $K_3$. Here, when the vehicle A is in a spinning state, the steering current and the transverse acceleration Gy increase and thus both of the detection result of the transverse G sensor 6 and the detection result of the steering current detecting unit 8B reach the maximum values (saturated values). On the contrary, the yaw rate $\gamma$ increases, but since the degree of increase of the yaw rate $\gamma$ is relatively small, the detection result of the yaw rate sensor 7 does not reach the maximum value (saturated value). Accordingly, the detection result of the yaw rate sensor 7 varies depending on the degree of the spinning state of the vehicle A. Therefore, the feedback axial force $T_{FB}$ can vary depending on the degree of the spinning state of the vehicle A. As a result, the control computing unit 11 according to this embodiment can apply a more appropriate steering reaction force by driving the reaction force motor 9A on the basis of the feedback axial force $T_{FB}$.

Referring to FIG. 3 again, the final axial force calculating unit 11Bc reads the feedforward axial force $T_{FF}$ and the feedback axial force $T_{FB}$ from the feedforward axial force calculating unit 11Ba and the feedback axial force calculating unit 11Bb. Subsequently, the final axial force calculating unit 11Bc calculates a steering-rack axial force (hereinafter, referred to as a final axial force) according to a formula (6) on the basis of the read feedforward axial force $T_{FF}$ and the read feedback axial force $T_{FB}$. The final axial force calculating unit 11Bc outputs the calculation result to the axial force-steering reaction force conversion unit 11Bd.

$$\text{Final axial force} = \text{feedforward axial force } T_{FF} \times G_F + \text{feedback axial force } T_{FB} \times (1 - G_F) \quad (6)$$

Here, $G_F$ represents a numerical value (hereinafter, referred to as an allocation ratio) representing the allocation ratio $G_F$ of the feedforward axial force $T_{FF}$ and the allocation ratio $(1-G_F)$ of the feedback axial force $T_{FB}$. The final axial force calculating unit 11Bc adds the feedforward axial force $T_{FF}$ and the feedback axial force $T_{FB}$ at a ratio of $G_F:(1-G_F)$ to calculate the final axial force.

In this way, the final axial force calculating unit 11Bc according to this embodiment calculates the final axial force on the basis of the feedback axial force $T_{FB}$ and the feedforward axial force $T_{FF}$. Here, the feedback axial force $T_{FB}$ reflects the influence of the tire transverse force Fd acting on the steered wheels 2 and thus varies depending on a variation in road surface state or a variation in vehicle state. On the contrary, the feedforward axial force $T_{FF}$ does not reflect the influence of the tire transverse force Fd and thus varies smoothly regardless of the variation in road surface state or the like. Therefore, the final axial force calculating unit 11Bc can calculate a more appropriate final axial force by calculating the final axial force on the basis of the feedforward axial force $T_{FF}$ in addition to the feedback axial force $T_{FB}$. As a result, the control computing unit 11 according to this embodiment can apply a more appropriate steering reaction force by driving the reaction force motor 9A on the basis of the feedback axial force $T_{FB}$.

Here, as the method of setting the allocation ratio $G_F$, a method of reading an allocation ratio $G_F$ corresponding to an axial force difference from an allocation ratio map M1. The axial force difference is a difference between the feedforward axial force $T_{FF}$ and the feedback axial force $T_{FB}$. Specifically, the axial force difference is a subtraction result obtained by subtracting the feedback axial force $T_{FB}$ from the feedforward axial force $T_{FF}$. The allocation ratio map M1 is a map in which an allocation ratio $G_F$ corresponding to the axial force difference is registered.

Here, the feedforward axial force $T_{FF}$ is calculated according to the formula (1) derived on the basis of a predetermined road surface state or a predetermined vehicle state. Therefore, the estimation accuracy of the feedforward axial force $T_{FF}$ decreases when the road surface state or the vehicle state varies. On the contrary, the estimation accuracy of the feedback axial force $T_{FB}$ is almost constant regardless of the road surface state or the vehicle state. Accordingly, the final axial force calculating unit 11Bc according to this embodiment uses the axial force difference, which is a difference between the feedforward axial force $T_{FF}$ and the feedback axial force $T_{FB}$, as an index for setting the allocation ratio $G_F$, that is, the allocation ratio of the feedforward axial force $T_{FF}$ and the allocation ratio of the feedback axial force $T_{FB}$. Accordingly, the final axial force calculating unit 11Bc according to this embodiment can set a more appropriate allocation ratio $G_F$.

Figure 7:
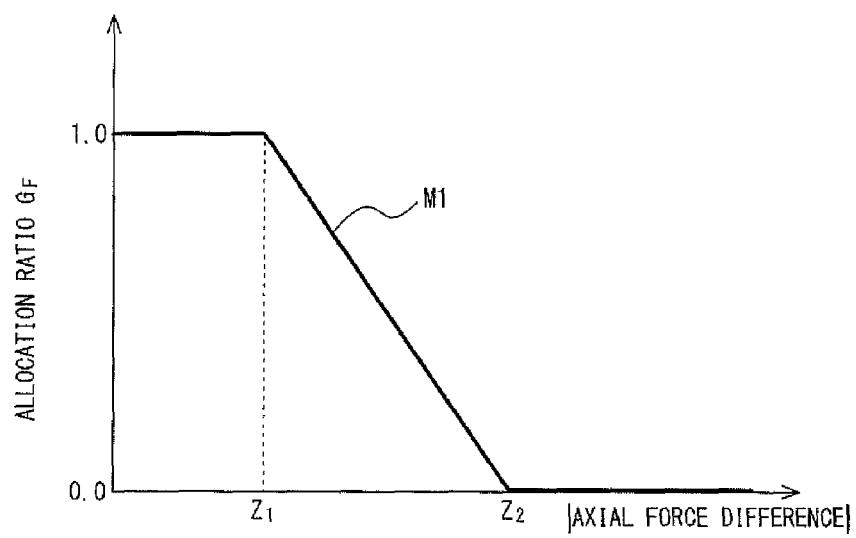
FIG. 7 is a graph illustrating an allocation ratio map M1.

FIG. 7 is a graph illustrating an allocation ratio map M1. As illustrated in FIG. 7, in the allocation ratio map M1, the allocation ratio $G_F$ is set to a predetermined first allocation ratio (for example, "1.0") regardless of the magnitude of the axial force difference in a range in which the absolute value of the axial force difference is equal to or greater than 0 and less than a first set value $Z_1$ (>0). The first set value $Z_1$ is an axial force difference (threshold value) at which the estimation accuracy of the feedforward axial force $T_{FF}$ starts decreasing. In the allocation ratio map M1, the allocation ratio $G_F$ is set to a second allocation ratio (for example, "0.0") smaller than the first allocation ratio regardless of the magnitude of the axial force difference in a range in which the absolute value of the axial force difference is equal to or greater than a second set value $Z_2$ (>$Z_1$). The second set value $Z_2$ is an axial force difference (threshold value) at which the estimation accuracy of the feedforward axial force $T_{FF}$ is lower than the estimation accuracy of the feedback axial force $T_{FB}$. In the allocation ratio map M1, the allocation ratio $G_F$ is made to linearly decrease with an increase of the absolute value of the axial force difference in a range in which the absolute value of the axial force difference is equal to or greater than the first set value $Z_1$ and less than the second set value $Z_2$. Specifically, in the allocation ratio map M1, the allocation ratio $G_F$ can be calculated according to a linear function representing the relationship between the absolute value of the axial force difference and the allocation ratio $G_F$ by the allocation ratio based on the axial force difference in the range in which the absolute value of the axial force difference is equal to or greater than the first set value $Z_1$ and less than the second set value $Z_2$.

In the linear function, the allocation ratio $G_F$ is set to "1.0" when the absolute value of the axial force difference is equal to the first set value $Z_1$, and the allocation ratio $G_F$ is set to "0.0" when the absolute value of the axial force difference is equal to the second set value $Z_2$. Accordingly, when the absolute value of the axial force difference is less than the first set value $Z_1$, the final axial force calculating unit 11Bc sets the feedforward axial force $T_{FF}$ as the final axial force. When the absolute value of the axial force difference is equal to or greater than the second set value $Z_2$, the final axial force calculating unit 11Bc sets the feedback axial force $T_{FB}$ as the final axial force. In the allocation ratio map M1, when the absolute value of the axial force difference is equal to or greater than the first set value $Z_1$ and less than the second set value $Z_2$, the sum of the value obtained by multiplying the feedforward axial force $T_{FF}$ by the allocation ratio $G_F$ and the value obtained by the feedback axial force $T_{FB}$ by the allocation ratio (1−$G_F$) is set as the final axial force.

Referring to FIG. 3 again, the axial force-steering reaction force conversion unit 11Bd calculates the target steering reaction force on the basis of the final axial force calculated by the final axial force calculating unit 11Bc. The target steering reaction force is a target value of the steering reaction force. As the method of calculating the target steering reaction force, a method of reading the target steering reaction force corresponding to the vehicle speed V and the final axial force from an axial force-steering reaction force conversion map can be employed. The axial force-steering reaction force conversion map is a map which is set for each vehicle speed V and in which a target steering reaction force corresponding to a final axial force is registered.

Figure 8:
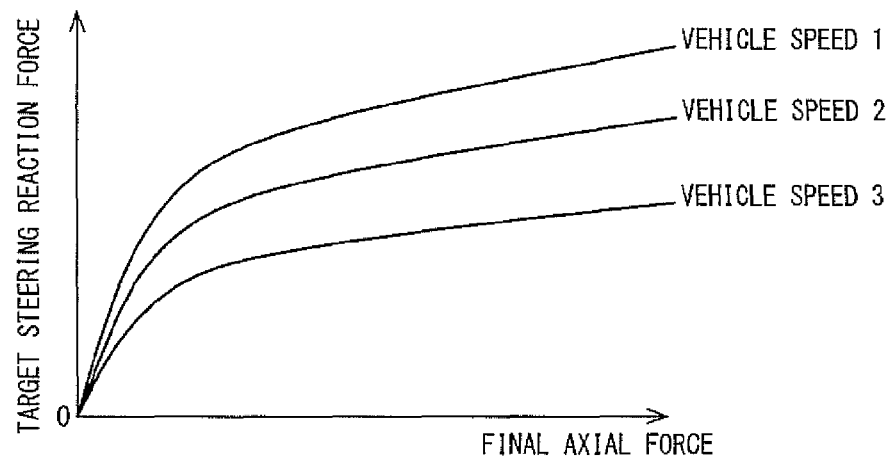
FIG. 8 is a graph illustrating an axial force-steering reaction force conversion map.

FIG. 8 is a graph illustrating the axial force-steering reaction force conversion map. As illustrated in FIG. 8, the axial force-steering reaction force conversion map is set for each vehicle speed V. In the axial force-steering reaction force conversion map, the larger the final axial force is, the larger value the target steering reaction force is set to.

Referring to FIG. 3 again, the target reaction force current computing unit 11Be calculates the target reaction force current according to a formula (7) on the basis of the target steering reaction force calculated by the axial force-steering reaction force conversion unit 11Bd. Then, the target reaction force current computing unit 11Be outputs the calculation result to the reaction force motor drive unit 9C.

Target reaction force current=target steering reaction force×gain  (7)

Referring to FIG. 2 again, the target steering current computing unit 11C calculates the target steering current on the basis of the subtraction result obtained by subtracting the steering angle θ detected by the steering angle sensor 4 from the target steering angle θ* calculated by the target steering angle computing unit 11A. The target steering current computing unit 11C outputs the calculation result to the steering motor drive unit 8C.

The operation of the steering control apparatus of the vehicle A will be described below. It is assumed that a driver steers the steering wheel 1 while the vehicle A is traveling. Then, the control computing unit 11 calculates the target steering angle θ* on the basis of the steering wheel angle θ and the vehicle speed V (the target steering angle computing unit 11A illustrated in FIG. 2). Subsequently, the control computing unit 11 calculates the target steering current on the basis of the subtraction result obtained by subtracting the actual steering angle θ from the calculated target steering angle θ* (the target steering current computing unit 11C illustrated in FIG. 2). Accordingly, the steering control unit 8 steers the steered wheels 2 in response to the driver's steering operation.

The control computing unit 11 also calculates the feedforward axial force $T_{FF}$ on the basis of the steering wheel angle δ and the vehicle speed V (the feedforward axial force calculating unit 11Ba illustrated in FIG. 3). Subsequently, the control computing unit 11 calculates the transverse-G axial force on the basis of the transverse acceleration Gy (the feedback axial force calculating unit 11Bb illustrated in FIG. 3). Subsequently, the control computing unit 11 calculates the current axial force on the basis of the steering current (the feedback axial force calculating unit 11Bb illustrated in FIG. 3). Subsequently, the control computing unit 11 calculates the yaw-rate axial force on the basis of the yaw rate γ and the vehicle speed V (the feedback axial force calculating unit 11Bb illustrated in FIG. 3). Subsequently, the control computing unit 11 calculates the feedback axial force $T_{FB}$ on the basis of the value obtained by multiplying the calculated current axial force by the allocation ratio $K_2$, the value obtained by multiplying the transverse-G axial force by the allocation ratio $K_1$, and the value obtained by multiplying the calculated transverse-G axial force by the allocation ratio $K_3$ (the feedback axial force calculating unit 11Bb illustrated in FIG. 3). The allocation ratios $K_1$, $K_2$, and $K_3$ of the transverse-G axial force, the current axial force, and the yaw-rate axial force are set to 0.6:0.3:0.1 (the feedback axial force calculating unit 11Bb illustrated in FIG. 3). Here, it is assumed that the absolute value of the axial force difference which is a difference between the feedforward axial force $T_{FF}$ and the feedback axial force $T_{FB}$ is less than the first set value $Z_1$. Then, the control computing unit 11 sets the allocation ratio $G_F$ to "1.0" and sets the allocation ratio $(1-G_F)$ to "0.0" on the basis of the allocation ration map M1 illustrated in FIG. 7 (the final axial force calculating unit 11Bc illustrated in FIG. 3).

Subsequently, the control computing unit 11 allocates the calculated feedforward axial force $T_{FF}$ and the calculated feedback axial force $T_{FB}$ at $G_F:(1-G_F)=1.0:0.0$ and calculates the final axial force (the final axial force calculating unit 11Bc illustrated in FIG. 3). Accordingly, the control computing unit 11 sets only the feedforward axial force $T_{FF}$ as the final axial force. Accordingly, the feedback axial force $T_{FB}$, that is, the estimated value of the steering-rack axial force into which sensor noise due to the vehicle speed sensor 5, the transverse G sensor 6, and the yaw rate sensor 7 or the influence road surface disturbance due to road surface unevenness is mixed, is excluded from the final axial force. Therefore, the final axial force smoothly varies without reflecting the sensor noise or the influence of the road surface disturbance. Subsequently, the control computing unit 11 calculates the target steering reaction force on the basis of the calculated final axial force (the axial force-steering reaction force conversion unit 11Bd illustrated in FIG. 3). Subsequently, the control computing unit 11 calculates the target reaction force current on the basis of the calculated target steering reaction force (the target reaction force current computing unit 11Be illustrated in FIG. 3). Subsequently, the control computing unit 11 drives the reaction force motor 9A on the basis of the calculated target reaction force current (the reaction force motor drive unit 9C illustrated in FIG. 2). Accordingly, the reaction force control unit 9 applies the steering reaction force to the steering wheel 1.

In this way, in the steering control apparatus according to this embodiment, when the absolute value of the axial force difference is less than the first set value $Z_1$, that is, when the estimation accuracy of the feedforward axial force $T_{FF}$ is relatively high, the feedforward axial force $T_{FF}$ is set as the final axial force. Accordingly, in the steering control apparatus according to this embodiment, the final axial force can be made to be smoothly and stably vary without varying due to the sensor noise or the road surface disturbance. Accordingly, in the steering control apparatus according to this embodiment, it is possible to apply a steering reaction force causing a smooth and stable feeling of steering without any kickback due to the sensor noise or the road surface disturbance. As a result, the steering control apparatus according to this embodiment can apply a more appropriate steering reaction force.

It is assumed that the road surface state or the vehicle state varies and the estimation accuracy of the feedforward axial force $T_{FF}$ is lowered while the control computing unit 11 repeating the above-mentioned flow. It is assumed that the axial force difference increases with the decrease in the estimation accuracy of the feedforward axial force $T_{FF}$ and the axial force difference is equal to or greater than the first set value $Z_1$ and less than the second set value $Z_2$. Then, the control computing unit 11 sets the allocation ratios $G_F$ and $(1-G_F)$ to a numerical value equal to or greater than "0.0" and equal to or less than "1.0" on the basis of the allocation ratio map M1 illustrated in FIG. 7 (the final axial force calculating unit 11Bc illustrated in FIG. 3). Subsequently, the control computing unit 11 allocates the calculated feedforward axial force $T_{FF}$ and the calculated feedback axial force $T_{FB}$ at $G_F:(1-G_F)$ and calculates the final axial force (the final axial force calculating unit 11Bc illustrated in FIG. 3). Accordingly, the control computing unit 11 sets the sum of the value obtained by the feedforward axial force $T_{FF}$ by the allocation ratio $G_F$ and the value obtained by multiplying the feedback axial force $T_{FB}$ by the allocation ratio $(1-G_F)$ as an increase final axial force. Then, the control computing unit 11 decreases the allocation ratio $G_F$ of the feedforward axial force $T_{FF}$ in the final axial force, that is, the allocation ratio $G_F$ of the estimated value of the steering-rack axial force of which the estimation accuracy decreases. Therefore, the final axial force is smooth and reflects the influence of the road surface disturbance while suppressing a decrease in the estimation accuracy. In this way, the steering control apparatus according to this embodiment, when the absolute value of the axial force difference is equal to or greater than the first set value $Z_1$, that is, when the estimation accuracy of the feedforward axial force $T_{FF}$ decreases, the sum of the value obtained by multiplying the feedforward axial force $T_{FF}$ by the allocation ratio $G_F$ and the value obtained by multiplying the feedback axial force $T_{FB}$ by the allocation ratio $(1-G_F)$ is set as the final axial force. Accordingly, in the steering control apparatus according to this embodiment, the final axial force is switched from the feedforward axial force $T_{FF}$ to the sum of the value obtained by multiplying the feedforward axial force $T_{FF}$ by the allocation ratio $G_F$ and the value obtained by multiplying the feedback axial force $T_{FB}$ by the allocation ratio $(1-G_F)$. Therefore, in the steering control apparatus according to this embodiment, it is possible to cause the final axial force to smoothly and stably vary while suppressing a decrease in the estimation accuracy. Accordingly, in the steering control apparatus according to this embodiment, by applying the steering reaction force on the basis of the final axial force, it is possible to suppress a kickback due to the sensor noise or the road surface disturbance and to apply a steering reaction force giving a smooth and stable feeling of steering. As a result, in the steering control apparatus according to this embodiment, it is possible to apply a more appropriate steering reaction force.

It is assumed that the road surface state or the vehicle state further varies and the estimation accuracy of the feedforward axial force $T_{FF}$ further decreases while the control computing unit 11 repeats the above-mentioned flow. It is assumed that the axial force difference increases with the decrease of the estimation accuracy of the feedforward axial force $T_{FF}$ and the axial force difference is equal to or greater than the second set value $Z_2$. Then, the control computing unit 11 sets the allocation ratio $G_F$ to "0.0" and sets the allocation ratio $(1-G_F)$ to "1.0" on the basis of the allocation ratio map M1 illustrated in FIG. 7 (the final axial force calculating unit 11Bc illustrated in FIG. 3). Subsequently, the control computing unit 11 allocates the feedforward axial force $T_{FF}$ and the feedback axial force $T_{FB}$ at $G_F:(1-G_F)=0.0:1.0$ and calculates the final axial force (the final axial force calculating unit 11Bc illustrated in FIG. 3). Accordingly, the control computing unit 11 sets only the feedback axial force $T_{FB}$ as the final axial force. Accordingly, the control computing unit 11 excludes the feedforward axial force $T_{FF}$, that is, the estimated value of the steering-rack axial force of which the estimation accuracy decreases from the final axial force. Therefore, the final axial force reflects the influence of the road surface disturbance while suppressing the decrease in the estimation accuracy.

In this way, in the steering control apparatus according to this embodiment, when the absolute value of the axial force difference is equal to or greater than the second set value $Z_2$, that is, when the estimation accuracy of the feedback axial force $T_{FB}$ is higher than the estimation accuracy of the feedforward axial force $T_{FF}$, the feedback axial force $T_{FB}$ is set as the final axial force. Accordingly, in the steering control apparatus according to this embodiment, the final axial force is switched from the sum of the value obtained by multiplying the feedforward axial force $T_{FF}$ by the allocation ratio $G_F$ and the value obtained by multiplying the feedback axial force $T_{FB}$ by the allocation ratio $(1-G_F)$ to the feedback axial force $T_{FB}$. Therefore, in the steering control apparatus according to this embodiment, it is possible to improve the estimation accuracy of the final axial force in comparison with the sum of the value obtained by multiplying the feedforward axial force $T_{FF}$ by the allocation ratio $G_F$ and the value obtained by multiplying the feedback axial force $T_{FB}$ by the allocation ratio $(1-G_F)$. As a result, in the steering control apparatus according to this embodiment, it is possible to apply a more appropriate steering reaction force by applying the steering force on the basis of the final axial force.

In this embodiment, the steering wheel 1 illustrated in FIG. 1 corresponds to the steering wheel. Similarly, the steering wheel angle sensor 3 illustrated in FIG. 1 corresponds to the steering wheel angle detecting unit. The steering motor 8A illustrated in FIG. 1 corresponds to the steering motor. The steering motor drive unit 8C and the control computing unit 11 illustrated in FIGS. 1 and 2 and the target steering angle computing unit 11A and the target steering current computing unit 11C illustrated in FIG. 2 correspond to the steering motor drive unit. The vehicle speed V, the transverse acceleration Gy, the yaw rate γ, and the steering current correspond to the state quantity of the vehicle. The vehicle speed sensor 5, the transverse G sensor 6, the yaw rate sensor 7, and the steering current detecting unit 8B correspond to the state quantity detecting unit. The reaction force motor 9A illustrated in FIG. 1 corresponds to the reaction force motor. The feedforward axial force calculating unit 11Ba illustrated in FIG. 3 corresponds to the feedforward axial force computing unit. The feedback axial force calculating unit 11Bb corresponds to the feedback axial force computing unit. The final axial force calculating unit 11Bc illustrated in FIG. 3 corresponds to the final axial force setting unit. The reaction force motor drive unit 9C illustrated in FIGS. 1 and 2, the target steering reaction force computing unit 11B illustrated in FIG. 2, and the axial force-steering reaction force conversion unit 11Bd and the target reaction force current computing unit 11Be illustrated in FIG. 3 correspond to the reaction force motor drive unit.

This embodiment has the following effects.

(1) The control computing unit 11 allocates the feedback axial force $T_{FB}$ and the feedforward axial force $T_{FF}$ at the allocation ratios based on the axial force difference which is a difference between the feedback axial force $T_{FB}$ and the feedforward axial force $T_{FF}$ and sets the final axial force which is a steering-rack axial force. Then, the control computing unit 11 drives the reaction force motor 9A on the basis of the set final axial force. According to this configuration, since the feedback axial force $T_{FB}$ and the feedforward axial force $T_{FF}$ are allocated at the allocation ratios based on the axial force difference, it is possible to more appropriately allocate the feedback axial force $T_{FB}$ and the feedforward axial force $T_{FF}$. Therefore, it is possible to apply a more appropriate steering reaction force.

(2) When the absolute value of the axial force difference is equal to or greater than the first set value $Z_1$, the control computing unit 11 sets the allocation ratio $G_F$ of the feedforward axial force $T_{FF}$ to be smaller than the case where the absolute value of the axial force difference is less than the first set value $Z_1$. The control computing unit 11 drives the reaction force motor 9A on the basis of the set final axial force. According to this configuration, when the absolute value of the axial force difference is equal to or greater than the first set value $Z_1$, the allocation ratio $G_F$ of the feedforward axial force $T_{FF}$ is set to be small ($G_F$="0.0"). Accordingly, for example, when the estimation accuracy of the feedforward axial force $T_{FF}$ decreases and the axial force difference increases, the allocation ratio $(1-G_F)$ of the feedback axial force $T_{FB}$ can be made to increase ($(1-G_F)$=1.0). Accordingly, it is possible to apply a more appropriate steering reaction force.

(3) When the axial force difference is equal to or greater than the first set value $Z_1$ and less than the second set value $Z_2$, the final axial force calculating unit 11Bc decreases the allocation ratio $G_F$ of the feedforward axial force $T_{FF}$ corresponding to a degree of increase of the absolute value of the axial force difference. According to this configuration, for example, when the axial force difference increases and the axial force difference reaches the first set value $Z_1$, that is, when the final axial force is changed from the feedforward axial force $T_{FF}$ to the feedback axial force $T_{FB}$, the allocation ratio of the feedforward axial force $T_{FF}$ can be made to gradually decrease. Therefore, it is possible to gradually change the steering reaction force.

(Second Embodiment)

A second embodiment of the present invention will be described below with reference to the accompanying drawings. The same elements as in the first embodiment will be referenced by the same reference signs. In this embodiment, when the absolute value of the axial force difference is less than a predetermined third set value $Z_3$, a degree of decrease of the allocation ratio $G_F$ of the feedforward axial force $T_{FF}$ with respect to a degree of increase of the absolute value of the axial force difference is set to be smaller than the case where the absolute value of the axial force difference is equal to or greater than the third set value $Z_3$. Specifically, the second embodiment is different from the first embodiment in the shape of the allocation ratio map M1.

Figure 9:
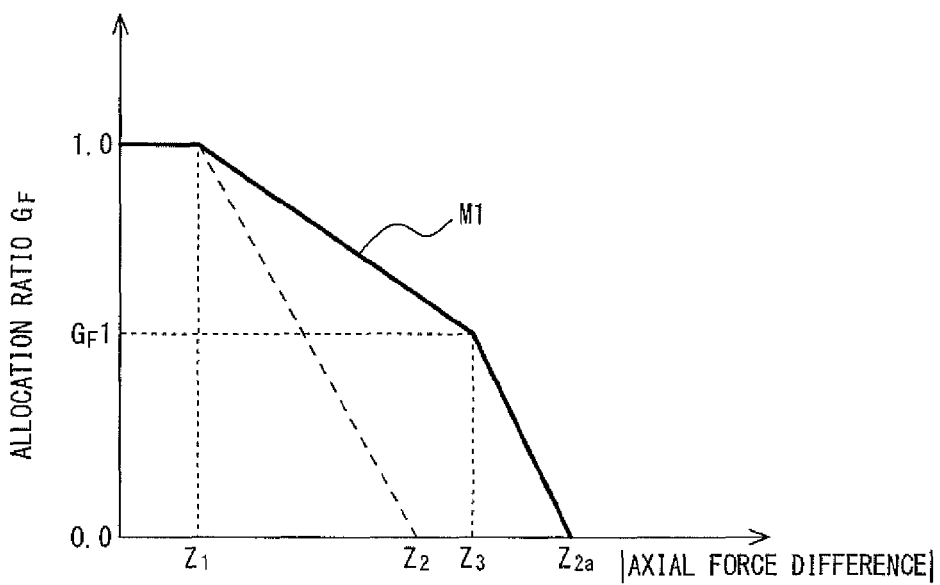
FIG. 9 is a graph illustrating an allocation ratio map M1 according to a second embodiment.

FIG. 9 is a graph illustrating an allocation ratio map M1 according to the second embodiment. As illustrated in FIG. 9, in the allocation ratio map M1, the allocation ratio $G_F$ is set to a relatively-large constant value "1.0" regardless of the magnitude of the axial force difference in a range in which the absolute value of the axial force difference is equal to or greater than 0 and less than the first set value $Z_1$. In the allocation ratio map M1, the allocation ratio $G_F$ is set to a relatively-small constant value "0.0" regardless of the magnitude of the axial force difference in a range in which the absolute value of the axial force difference is equal to or greater than a 2a-th set value $Z_2a$ ($>Z_1$). In the allocation ratio map M1, the allocation ratio $G_F$ is made to linearly decrease with an increase of the absolute value of the axial force difference in a range in which the absolute value of the axial force difference is equal to or greater than the first set value $Z_1$ and less than the third set value $Z_3$. Here, the third set value $Z_3$ is a value which is equal to or greater than the first set value $Z_1$ and equal to or less than the 2a-th set value $Z_2a$. Specifically, in the allocation ratio map M1, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the first set value $Z_1$ and less than the third set value $Z_3$. In the linear function, the allocation ratio $G_F$ is set to "1.0" when the absolute value of the axial force difference is equal to the first set value $Z_1$, and the allocation ratio $G_F$ is set to a numerical value $G_m$ (>0) when the absolute value of the axial force difference is equal to the third set value $Z_3$.

In the allocation ratio map M1, the allocation ratio $G_F$ is made to linearly decrease with the increase of the absolute value of the axial force difference in a range in which the absolute value of the axial force difference is equal to or greater than the third set value $Z_3$ and less than the 2a-th set value $Z_2a$. Specifically, in the allocation ratio map M1, the allocation ratio $G_F$ can be calculated according to a linear function representing the relationship between the absolute value of the axial force difference and the allocation ratio $G_F$ by the allocation ratio based on the axial force difference in the range in which the absolute value of the axial force difference is equal to or greater than the third set value $Z_3$ and less than the 2a-th set value $Z_2a$. In the linear function, the allocation ratio $G_F$ is set to a numerical value $G_m$ when the absolute value of the axial force difference is equal to the third set value $Z_3$, and the allocation ratio $G_F$ is set to "0.0" when the absolute value of the axial force difference is equal to the 2a-th set value $Z_2a$. Here, in the allocation ratio map M1, when the axial force difference is equal to or greater than the first set value $Z_1$ and less than the third set value $Z_3$, the slope of the linear function is set to be smaller than the case where the axial force difference is equal to or greater than the third set value $Z_3$ and less than the 2a-th set value $Z_2a$. Accordingly, when the axial force difference is less than the third set value $Z_3$, the final axial force calculating unit 11Bc sets the degree of decrease of the allocation ratio $G_F$ of the feedforward axial force $T_{FF}$ with respect to the degree of increase of the absolute value of the axial force difference to be smaller than the case where the axial force difference is equal to or greater than the third set value $Z_3$.

The other configurations are the same as the configurations of the first embodiment. In this embodiment, the first set value Z1 illustrated in FIG. 9 corresponds to the first set value. Similarly, the third set value $Z_3$ illustrated in FIG. 9 corresponds to the third set value.

This embodiment has the following effects in addition to the effects of the above-mentioned first embodiment.

(1) When the axial force difference is less than the third set value $Z_3$, the final axial force calculating unit 11Bc sets the degree of decrease of the allocation ratio $G_F$ of the feedforward axial force $T_{FF}$ with respect to the degree of increase of the absolute value of the axial force difference to be smaller than the case where the axial force difference is equal to or greater than the third set value $Z_3$. According to this configuration, for example, when the axial force difference increases and the axial force difference reaches the first set value Z1, that is, when the final axial force is changed from the feedforward axial force $T_{FF}$ to the feedback axial force $T_{FB}$, the allocation ratio of the feedforward axial force $T_{FF}$ can be made to gradually decrease. Therefore, it is possible to gradually change the steering reaction force. When the axial force difference reaches the third set value $Z_3$, that is, when the allocation ratio of the feedforward axial force $T_{FF}$ sufficiently decreases, the decreasing rate of the allocation ratio of the feedforward axial force $T_{FF}$ can be made to increase. Therefore, it is possible to shorten the time necessary for the variation of the final axial force.

(Third Embodiment)

A third embodiment of the present invention will be described below with reference to the accompanying drawings. The same elements as in the first embodiment will be referenced by the same reference signs. In this embodiment, when the vehicle speed V is less than a predetermined vehicle speed threshold value, a threshold value for determining whether or not the decrease of the allocation ratio of the feedforward axial force $T_{FF}$ is started is set to be greater than the case where the vehicle speed V is equal to or greater than the vehicle speed threshold value. In this embodiment, the degree of decrease of the allocation ratio $G_F$ of the feedforward axial force $T_{FF}$ with respect to the degree of increase of the absolute value of the axial force difference is set to be smaller. Specifically, the third embodiment is different from the first embodiment, in that the final axial force calculating unit 11Bc switches the allocation ratio maps M1 and M2 on the basis of the vehicle speed V.

As illustrated in FIG. 3, the final axial force calculating unit 11Bc determines whether or not the vehicle speed V detected by the vehicle speed sensor 5 is equal to or greater than a vehicle speed threshold value. The vehicle speed threshold value is an upper limit value (threshold value) of the vehicle speed V at which it can be determined that the estimation accuracy of the feedback axial force $T_{FB}$ does not influence the feeling of steering. When it is determined that the vehicle speed V is equal to or greater than the vehicle speed threshold value, the final axial force calculating unit 11Bc selects one allocation ratio map (hereinafter, also referred to as a high-speed travel allocation ratio map) M1 out of the allocation ratio maps M1 and M2. On the other hand, when it is determined that the vehicle speed V is less than the vehicle speed threshold value, the final axial force calculating unit 11Bc selects the other allocation ratio map (hereinafter, also referred to as a low-speed travel allocation ratio map) M2 out of the allocation ratio maps M1 and M2.

Figure 10:
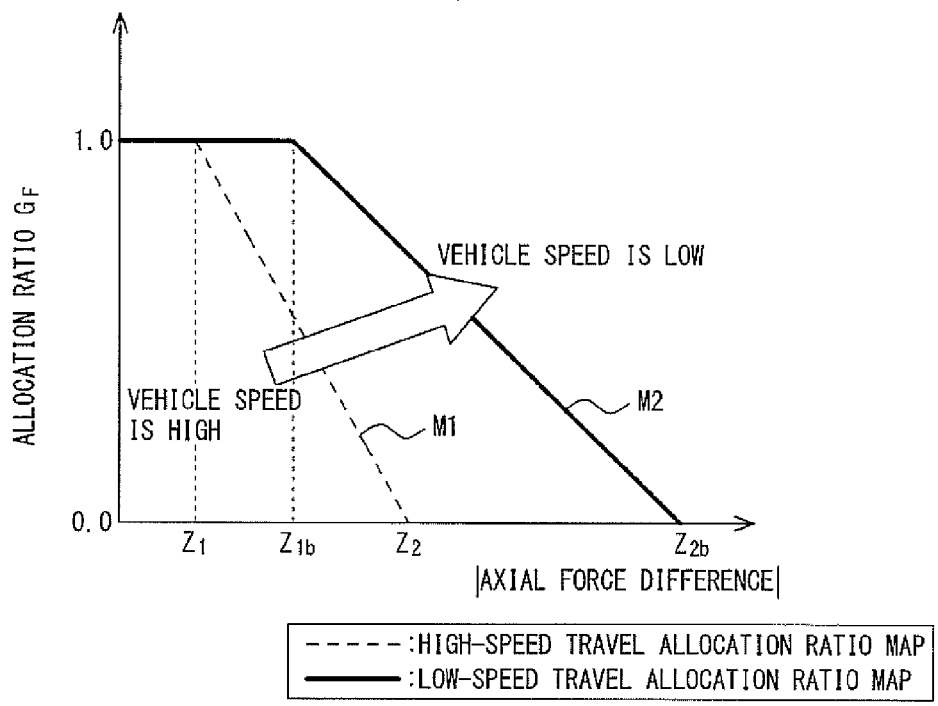
FIG. 10 is a graph illustrating a high-speed travel allocation ratio map M1 and a low-speed travel allocation ratio map M2 according to a third embodiment.

FIG. 10 is a graph illustrating the high-speed travel allocation ratio map M1 and the low-speed travel allocation ratio map M2 according to the third embodiment. In this embodiment, the shapes of the high-speed travel allocation ratio map M1 and the low-speed travel allocation ratio map M2 are similar to the shape (see FIG. 7) of the allocation ratio map M1 according to the first embodiment.

As illustrated in FIG. 10, in the high-speed travel allocation ratio map M1, the allocation ratio $G_F$ is set to a relatively-large constant value "1.0" regardless of the magnitude of the axial force difference in a range in which the absolute value of the axial force difference is equal to or greater than 0 and less than the first set value $Z_1$. In the high-speed travel allocation ratio map M1, the allocation ratio $G_F$ is set to a relatively-small constant value "0.0" regardless of the magnitude of the axial force difference in a range in which the absolute value of the axial force difference is equal to or greater than the second set value $Z_2$. In the high-speed travel allocation ratio map M1, the allocation ratio $G_F$ is made to linearly decrease with an increase of the absolute value of the axial force difference in a range in which the absolute value of the axial force difference is equal to or greater than the first set value $Z_1$ and less than the second set value $Z_2$. Specifically, in the high-speed travel allocation ratio map M1, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the first set value $Z_1$ and less than the second set value $Z_2$. In the linear function, the allocation ratio $G_F$ is set to "1.0" when the absolute value of the axial force difference is equal to the first set value $Z_1$, and the allocation ratio $G_F$ is set to "0.0" when the absolute value of the axial force difference is equal to the second set value $Z_2$.

In the low-speed travel allocation ratio map M2, the allocation ratio $G_F$ is set to a relatively-large constant value "1.0" regardless of the magnitude of the axial force difference in a range in which the absolute value of the axial force difference is equal to or greater than 0 and less than a 1b-th set value $Z_1b$ (>$Z_1$). Accordingly, the final axial force calculating unit 11Bc sets the threshold value for determining whether or not the decrease of the allocation ratio of the feedforward axial force $T_{FF}$ is started in the low-speed travel allocation ratio map M2 to be greater than that in the high-speed travel allocation ratio map M1. In the low-speed travel allocation ratio map M2, the allocation ratio $G_F$ is set to a relatively-small constant value "0.0" regardless of the magnitude of the axial force difference in a range in which the absolute value of the axial force difference is equal to or greater than a 2b-th set value $Z_2b$ (>$Z_1b$). In the low-speed travel allocation ratio map M2, the allocation ratio $G_F$ is made to linearly decrease with an increase of the absolute value of the axial force difference in a range in which the absolute value of the axial force difference is equal to or greater than the 1b-th set value $Z_1b$ and less than the 2b-th set value $Z_2b$. Specifically, in the low-speed travel allocation ratio map M2, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the 1b-th set value $Z_1b$ and less than the 2b-th set value $Z_2b$. In the linear function, the allocation ratio $G_F$ is set to "1.0" when the absolute value of the axial force difference is equal to the 1b-th set value $Z_1b$, and the allocation ratio $G_F$ is set to "0.0" when the absolute value of the axial force difference is equal to the 2b-th set value $Z_2b$. In the low-speed travel allocation ratio map M2, the slope of the linear function representing the relationship between the absolute value of the axial force difference and the allocation ratio is set to be smaller than that in the high-speed travel allocation ratio map M1. Accordingly, when the vehicle speed V is less than the vehicle speed threshold value, the final axial force calculating unit 11Bc sets the degree of decrease of the allocation ratio $G_F$ of the feedforward axial force $T_{FF}$ with respect to the degree of increase of the absolute value of the axial force difference to be smaller than the case where the vehicle speed V is equal to or greater than the vehicle speed threshold value.

The other configurations are the same as the configurations of the first embodiment. In this embodiment the first set value $Z_1$ and the 1b-th set value $Z_1b$ illustrated in FIG. 10 correspond to the first set value. Similarly, the second set value $Z_2$ and the 2b-th set value $Z_2b$ illustrated in FIG. 10 correspond to the second set value. The vehicle speed sensor 5 illustrated in FIGS. 1 and 2 correspond to the vehicle speed detecting unit.

This embodiment has the following effects in addition to the effects of the above-mentioned embodiments.

(1) When the vehicle speed V is less than the vehicle speed threshold value, the final axial force calculating unit 11Bc sets the threshold value for determining whether or not the decrease of the allocation ratio of the feedforward axial force $T_{FF}$ is started to be greater than the case where the vehicle speed V is equal to or greater than the vehicle speed threshold value ($Z_1$→$Z_1b$). In this embodiment, the degree of decrease of the allocation ratio $G_F$ of the feedforward axial force $T_{FF}$ with respect to the degree of increase of the absolute value of the axial force difference is set to decrease. According to this configuration, when the vehicle speed V is low, that is, when the decrease of the estimation accuracy of the feedback axial force $T_{FB}$ does not influence the feeling of steering, the timing at which the decrease of the allocation ratio of the feedforward axial force $T_{FF}$ is started can be made to delay. When the final axial force is changed from the feedforward axial force $T_{FF}$ to the feedback axial force $T_{FB}$, the allocation ratio of the feedforward axial force $T_{FF}$ can be made to slowly decrease. Therefore, it is possible to make variation of the steering reaction force slow.

Modification Example (1) In this embodiment, an example where the shapes of the allocation ratio maps M1 and M2 are set to the similar shape to that of the allocation ratio map M1 (see FIG. 7) according to the first embodiment is described, but other configurations may be employed. For example, the shapes of the allocation ratio maps M1 and M2 according to this embodiment may be set to the similar shape to that of the allocation ratio map M1 according to the second embodiment. That is, in the allocation ratio map M1, the degree of decrease of the allocation ratio $G_F$ of the feedforward axial force $T_{FF}$ with respect to the degree of increase of the absolute value of the axial force difference may vary between before and after a set value set between the first set value $Z_1$ and the second set value $Z_2$. In the allocation ratio map M2, the degree of decrease of the allocation ratio $G_F$ of the feedforward axial force $T_{FF}$ with respect to the degree of increase of the absolute value of the axial force difference may vary between before and after a set value set between the 1b-th set value $Z_1b$ and the 2b-th set value $Z_2b$.

(Fourth Embodiment)

A fourth embodiment of the present invention will be described below with reference to the accompanying drawings. The same elements as in the above-mentioned embodiments will be referenced by the same reference signs. In this embodiment, when the steering wheel angular velocity dδ is equal to or greater than a predetermined angular velocity threshold value, the degree of decrease of the allocation ratio $G_F$ of the feedforward axial force $T_{FF}$ with respect to the degree of increase of the absolute value of the axial force difference is set to be smaller than the case where the steering wheel angular velocity dδ is less than the angular velocity threshold value. Specifically, the fourth embodiment is different from the first embodiment, in that the final axial force calculating unit 11Bc switches the allocation ratio maps M1 and M2 on the basis of the steering wheel angular velocity dδ.

As illustrated in FIG. 3, the final axial force calculating unit 11Bc calculates the steering wheel angular velocity dδ by temporally differentiating the steering wheel angle δ detected by the steering wheel angle sensor 3. Then, the final axial force calculating unit 11Bc determines whether or not the calculated steering wheel angular velocity dδ is equal to or greater than a steering wheel angle threshold value. The steering wheel angle threshold value is a lower limit value (threshold value) of the steering wheel angular velocity dδ at which it can be determined that a driver does not give priority to a feeling of steering at emergency avoidance steering and the like. When it is determined that the steering wheel angular velocity dδ is equal to or greater than the steering wheel angle threshold value, the final axial force calculating unit 11Bc selects one allocation ratio map (hereinafter, also referred to as a high-speed steering allocation ratio map) M2 out of the allocation ratio maps M1 and M2. On the other hand, when it is determined that the steering wheel angular velocity dδ is less than the steering wheel angle threshold value, the final axial force calculating unit 11Bc selects the other allocation ratio map (hereinafter, low-speed steering allocation ratio map) M1 out of the allocation ratio maps M1 and M2.

Figure 11:
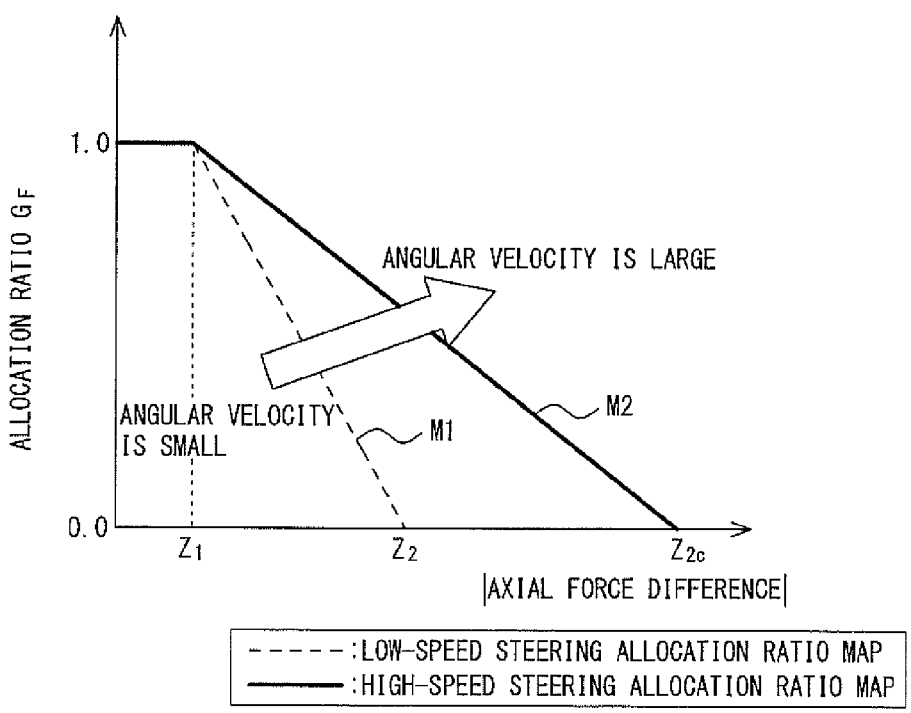
FIG. 11 is a graph illustrating a low-speed steering allocation ratio map M1 and a high-speed steering allocation ratio map M2 according to a fourth embodiment.

FIG. 11 is a graph illustrating the low-speed steering allocation ratio map M1 and the high-speed steering allocation ratio map M2 according to the fourth embodiment. In this embodiment, the shapes of the high-speed steering allocation ratio map M1 and the low-speed steering allocation ratio map M2 are similar to the shape (see FIG. 7) of the allocation ratio map M1 according to the first embodiment.

As illustrated in FIG. 11, in the low-speed steering allocation ratio map M1, the allocation ratio $G_F$ is set to a relatively-large constant value "1.0" regardless of the magnitude of the axial force difference in a range in which the absolute value of the axial force difference is equal to or greater than 0 and less than the first set value $Z_1$. In the low-speed steering allocation ratio map M1, the allocation ratio $G_F$ is set to a relatively-small constant value "0.0" regardless of the magnitude of the axial force difference in a range in which the absolute value of the axial force difference is equal to or greater than the second set value $Z_2$. In the low-speed steering allocation ratio map M1, the allocation ratio $G_F$ is made to linearly decrease with an increase of the absolute value of the axial force difference in a range in which the absolute value of the axial force difference is equal to or greater than the first set value $Z_1$ and less than the second set value $Z_2$. Specifically, in the low-speed steering allocation ratio map M1, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the first set value $Z_1$ and less than the second set value $Z_2$. In the linear function, the allocation ratio $G_F$ is set to "1.0" when the absolute value of the axial force difference is equal to the first set value $Z_1$, and the allocation ratio $G_F$ is set to "0.0" when the absolute value of the axial force difference is equal to the second set value $Z_2$.

In the high-speed steering allocation ratio map M2, the allocation ratio $G_F$ is set to a relatively-large constant value "1.0" regardless of the magnitude of the axial force difference in a range in which the absolute value of the axial force difference is equal to or greater than 0 and less than the first set value $Z_1$. In the high-speed steering allocation ratio map M2, the allocation ratio $G_F$ is set to a relatively-small constant value "0.0" regardless of the magnitude of the axial force difference in a range in which the absolute value of the axial force difference is equal to or greater than a 2c-th set value $Z_2c$ ($>Z_1$). In high-speed steering allocation ratio map M2, the allocation ratio $G_F$ is made to linearly decrease with an increase of the absolute value of the axial force difference in a range in which the absolute value of the axial force difference is equal to or greater than the first set value $Z_1$ and less than the 2c-th set value $Z_2c$. Specifically, in the high-speed steering allocation ratio map M2, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the first set value $Z_1$ and less than the 2c-th set value $Z_2c$.

In the linear function, the allocation ratio $G_F$ is set to "1.0" when the absolute value of the axial force difference is equal to the first set value $Z_1$, and the allocation ratio $G_F$ is set to "0.0" when the absolute value of the axial force difference is equal to the 2c-th set value $Z_2c$. In the high-speed steering allocation ratio map M2, the slope of the linear function representing the relationship between the absolute value of the axial force difference and the allocation ratio is set to be smaller than that in the low-speed steering allocation ratio map M1. Accordingly, when the steering wheel angular velocity dδ is equal to or greater than the angular velocity threshold value, the final axial force calculating unit 11Bc sets the degree of decrease of the allocation ratio $G_F$ of the feedforward axial force $T_{FF}$ with respect to the degree of increase of the absolute value of the axial force difference to be smaller than the case where the steering wheel angular velocity dδ is less than the angular velocity threshold value.

The other configurations are the same as the configurations of the above-mentioned embodiments. In this embodiment the first set value $Z_1$ illustrated in FIG. 11 corresponds to the first set value. Similarly, the second set value $Z_2$ and the 2c-th set value $Z_2c$ illustrated in FIG. 11 correspond to the second set value. The final axial force calculating unit 11Bc illustrated in FIG. 3 correspond to the steering wheel angular velocity detecting unit.

This embodiment has the following effects in addition to the effects of the above-mentioned embodiments.

(1) When the steering wheel angular velocity dδ is equal to or greater than the angular velocity threshold value, the final axial force calculating unit 11Bc sets the degree of decrease of the allocation ratio $G_F$ of the feedforward axial force $T_{FF}$ with respect to the degree of increase of the absolute value of the axial force difference to be smaller than the case where the steering wheel angular velocity dδ is less than the angular velocity threshold value. According to this configuration, when the steering wheel angular velocity dδ is large, that is, when a driver does not give priority to a feeling of steering at emergency avoidance steering and the like, it is possible to make the decreasing rate of the allocation ratio of the feedforward axial force $T_{FF}$ small. Therefore, it is possible to make the variation of the steering reaction force slow.

Modification Example (1) In this embodiment, an example where the shapes of the allocation ratio maps M1 and M2 are set to the similar shape to that of the allocation ratio map M1 (see FIG. 7) according to the first embodiment is described, but other configurations may be employed. For example, the shapes of the allocation ratio maps M1 and M2 according to this embodiment may be set to the similar shape to that of the allocation ratio map M1 according to the second embodiment. That is, in the allocation ratio map M1, the degree of decrease of the allocation ratio $G_F$ of the feedforward axial force $T_{FF}$ with respect to the degree of increase of the absolute value of the axial force difference may vary between before and after a set value set between the first set value $Z_1$ and the second set value $Z_2$. In the allocation ratio map M2, the degree of decrease of the allocation ratio $G_F$ of the feedforward axial force $T_{FF}$ with respect to the degree of increase of the absolute value of the axial force difference may vary between before and after a set value set between the first set value $Z_1$ and the 2c-th set value $Z_2c$.

(2) In addition to the configuration in which the allocation ratio maps M1 and M2 are switched on the basis of the steering wheel angular velocity dδ as described in this embodiment, the configuration (hereinafter, also referred to as the configuration of the third embodiment) in which the allocation ratio maps M1 and M2 are switched on the basis of the vehicle speed V as in the third embodiment may be employed.

(Fifth Embodiment)

A fifth embodiment of the present invention will be described below with reference to the accompanying drawings. The same elements as in the above-mentioned embodiments will be referenced by the same reference signs. In this embodiment, when the axial force difference is a negative value, the degree of decrease of the allocation ratio $G_F$ of the feedforward axial force $T_{FF}$ with respect to the degree of increase of the absolute value of the axial force difference is set to be smaller than the case where the axial force difference is a positive value. Here, the axial force difference is a positive value when the feedforward axial force $T_{FF}$ is greater than the feedback axial force $T_{FB}$. The axial force difference is a negative value when the feedback axial force $T_{FB}$ is greater than the feedforward axial force $T_{FF}$. Specifically, the fifth embodiment is different from the first embodiment, in that the final axial force calculating unit 11Bc switches the allocation ratio maps M1 and M2 on the basis of the sign of the axial force difference.

As illustrated in FIG. 3, the final axial force calculating unit 11Bc determines whether or not the axial force difference is a positive value. When it is determined that the axial force difference is a positive value, the final axial force calculating unit 11Bc selects one allocation ratio map (hereinafter, also referred to as a positive-value allocation ratio map) M1 out of the allocation ratio maps M1 and M2. On the other hand, when it is determined that the axial force difference is a negative value, the final axial force calculating unit 11Bc selects the other allocation ratio map (hereinafter, negative-value allocation ratio map) M2 out of the allocation ratio maps M1 and M2.

Figure 12:
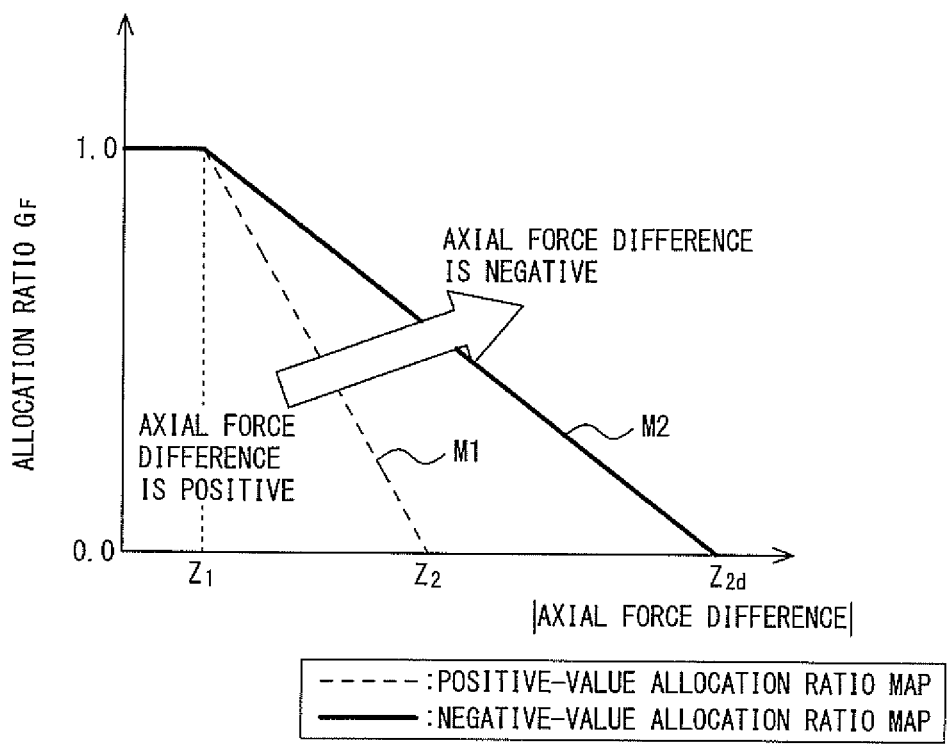
FIG. 12 is a graph illustrating a positive-value allocation ratio map M1 and a negative-value allocation ratio map M2 according to a fifth embodiment.

FIG. 12 is a graph illustrating the positive-value allocation ratio map M1 and the negative-value allocation ratio map M2 according to the fifth embodiment. In this embodiment, the shapes of the positive-value allocation ratio map M1 and the negative-value allocation ratio map M2 are similar to the shape (see FIG. 7) of the allocation ratio map M1 according to the first embodiment.

As illustrated in FIG. 12, in the positive-value allocation ratio map M1, the allocation ratio $G_F$ is set to a relatively-large constant value "1.0" regardless of the magnitude of the axial force difference in a range in which the absolute value of the axial force difference is equal to or greater than 0 and less than the first set value $Z_1$. In the positive-value allocation ratio map M1, the allocation ratio $G_F$ is set to a relatively-small constant value "0.0" regardless of the magnitude of the axial force difference in a range in which the absolute value of the axial force difference is equal to or greater than the second set value $Z_2$. In the positive-value allocation ratio map M1, the allocation ratio $G_F$ is made to linearly decrease with an increase of the absolute value of the axial force difference in a range in which the absolute value of the axial force difference is equal to or greater than the first set value $Z_1$ and less than the second set value $Z_2$. Specifically, in the positive-value allocation ratio map M1, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the first set value $Z_1$ and less than the second set value $Z_2$. In the linear function, the allocation ratio $G_F$ is set to "1.0" when the absolute value of the axial force difference is equal to the first set value $Z_1$, and the allocation ratio $G_F$ is set to "0.0" when the absolute value of the axial force difference is equal to the second set value $Z_2$.

In the negative-value allocation ratio map M2, the allocation ratio $G_F$ is set to a relatively-large constant value "1.0" regardless of the magnitude of the axial force difference in a range in which the absolute value of the axial force difference is equal to or greater than 0 and less than the first set value $Z_1$. In the negative-value allocation ratio map M2, the allocation ratio $G_F$ is set to a relatively-small constant value "0.0" regardless of the magnitude of the axial force difference in a range in which the absolute value of the axial force difference is equal to or greater than a 2d-th set value $Z_2d$ ($>Z_1$). In the negative-value allocation ratio map M2, the allocation ratio $G_F$ is made to linearly decrease with an increase of the absolute value of the axial force difference in a range in which the absolute value of the axial force difference is equal to or greater than the first set value $Z_1$ and less than the 2d-th set value $Z_2d$. Specifically, in the negative-value allocation ratio map M2, the allocation ratio $G_F$ can be calculated according to a linear function representing the relationship between the absolute value of the axial force difference and the allocation ratio $G_F$ by the allocation ratio based on the axial force difference in a range of the absolute value of the axial force difference is equal to or greater than the first set value $Z_1$ and less than the 2d-th set value $Z_2d$.

In the linear function, the allocation ratio $G_F$ is set to "1.0" when the absolute value of the axial force difference is equal to the first set value $Z_1$, and the allocation ratio $G_F$ is set to "0.0" when the absolute value of the axial force difference is equal to the 2d-th set value $Z_2d$. In the negative-value allocation ratio map M2, the slope of the linear function representing the relationship between the absolute value of the axial force difference and the allocation ratio is set to be smaller than that in the positive-value allocation ratio map M1. Accordingly, when the axial force difference is a negative value, the final axial force calculating unit 11Bc sets the degree of decrease of the allocation ratio $G_F$ of the feedforward axial force $T_{FF}$ with respect to the degree of increase of the absolute value of the axial force difference to be smaller than the case where the axial force difference is a positive value. The other configurations are the same as the configurations of the above-mentioned embodiments.

In this embodiment the first set value $Z_1$ illustrated in FIG. 12 corresponds to the first set value. Similarly, the second set value $Z_2$ and the 2d-th set value $Z_2d$ illustrated in FIG. 12 correspond to the second set value.

This embodiment has the following effects in addition to the effects of the first embodiment.

(1) When the axial force difference is a negative value, the control computing unit 11 sets the degree of decrease of the allocation ratio $G_F$ with respect to the degree of increase of the absolute value of the axial force difference, that is, the degree of decrease of the allocation ratio $G_F$ of the feedforward axial force $T_{FF}$, to be smaller than the case where the axial force difference is a positive value. According to this configuration, when the axial force difference is a negative value, that is, when the feedback axial force $T_{FB}$ is greater than the feedforward axial force $T_{FF}$, it is possible to make the decreasing rate of the allocation ratio of the feedforward axial force $T_{FF}$ small. Therefore, since the final axial force increases with the decrease of the allocation ratio of the feedforward axial force $T_{FF}$, it is possible to make the increase of the final axial force slow. As a result, it is possible to make the increase of the steering reaction force slow.

Modification Example (1) In this embodiment, an example where the shapes of the allocation ratio maps M1 and M2 are set to the similar shape to that of the allocation ratio map M1 (see FIG. 7) according to the first embodiment, but other configurations may be employed. For example, the shapes of the allocation ratio maps M1 and M2 according to this embodiment may be set to the similar shape to that of the allocation ratio map M1 according to the second embodiment. That is, in the allocation ratio map M1, the degree of decrease of the allocation ratio $G_F$ of the feedforward axial force $T_{FF}$ with respect to the degree of increase of the absolute value of the axial force difference may vary between before and after a set value set between the first set value $Z_1$ and the second set value $Z_2$. In the allocation ratio map M2, the degree of decrease of the allocation ratio $G_F$ of the feedforward axial force $T_{FF}$ with respect to the degree of increase of the absolute value of the axial force difference may vary between before and after a set value set between the first set value $Z_1$ and the 2d-th set value $Z_2$d.

(2) For example, in addition to the configuration (hereinafter, also referred to as the configuration according to this embodiment) in which the allocation ratio maps M1 and M2 are switched on the basis of the sign of the axial force difference as described in this embodiment, the configuration according to the third embodiment may be employed. For example, in addition to the configuration according to this embodiment, the configuration (hereinafter, referred to as the configuration according to the fourth embodiment) in which the allocation ratio maps M1 and M2 are switched on the basis of the steering wheel angular velocity dδ as described in the fourth embodiment may be employed. For example, in addition to the configuration according to this embodiment, the configuration according to the third embodiment and the configuration according to the fourth embodiment may be employed.

Sixth Embodiment

A sixth embodiment of the present invention will be described below with reference to the accompanying drawings. The same elements as in the above-mentioned embodiments will be referenced by the same reference signs. This embodiment is different from the above-mentioned embodiments, in that when the vehicle speed V is less than a first set value $V_1$ to be described later, the allocation ratio $G_{F\alpha}$ of the feedforward axial force $T_{FF}$ is set to be smaller than the case where the vehicle speed V is equal to or greater than the first set value $V_1$.

Figure 13:
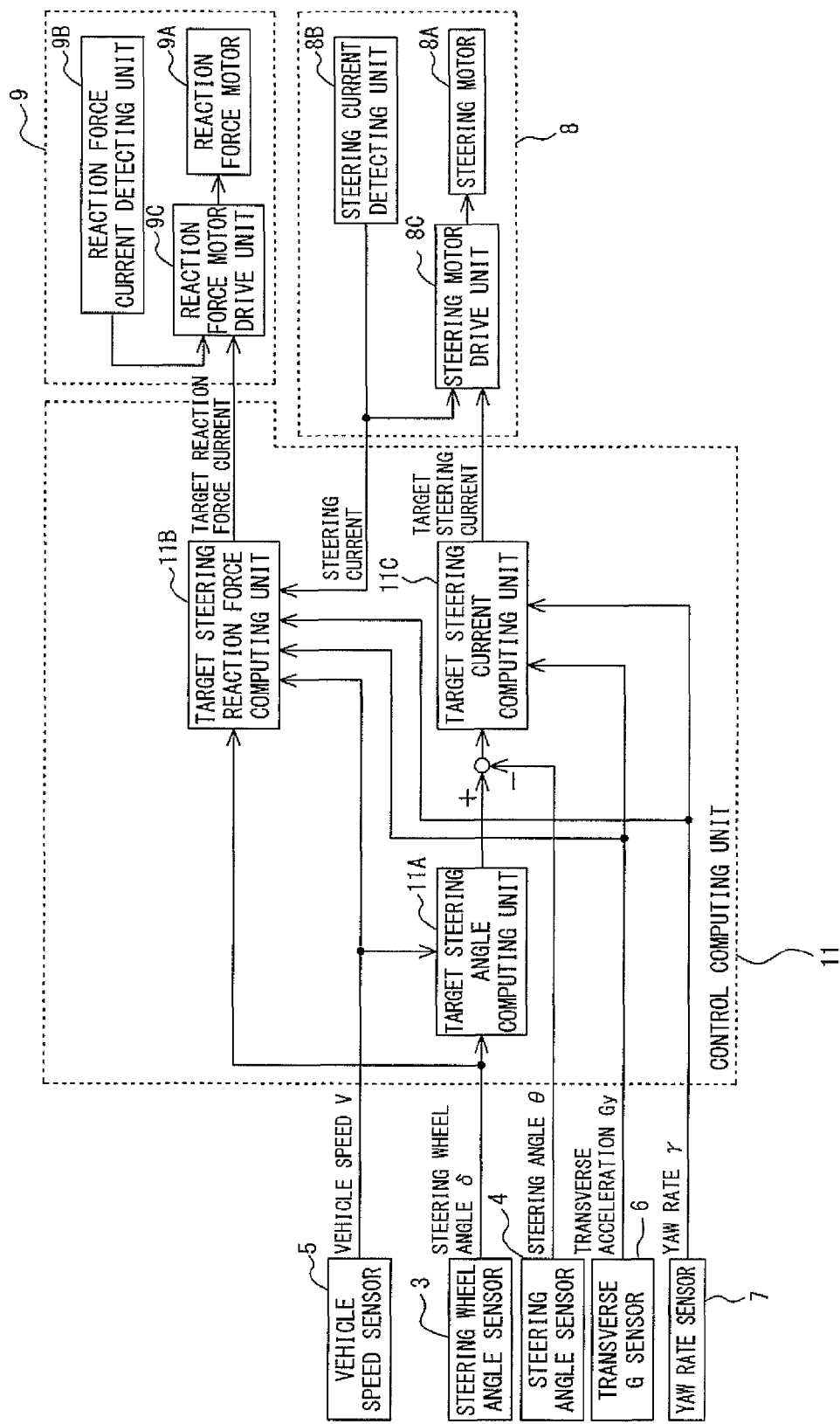
FIG. 13 is a block diagram illustrating a configuration of a control computing unit 11.
Figure 14:
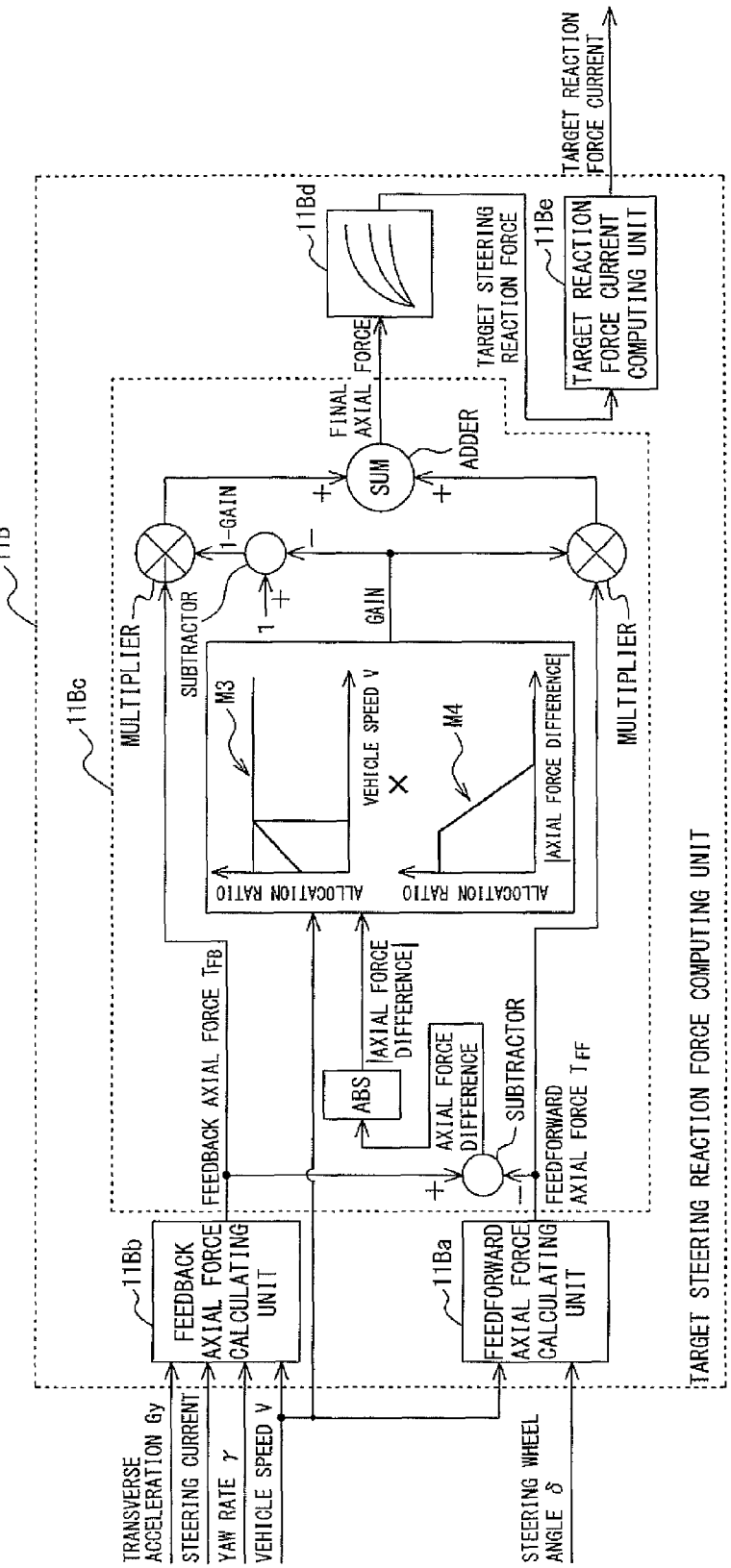
FIG. 14 is a block diagram illustrating a detailed configuration of a target steering reaction force computing unit 11B.

FIG. 13 is a block diagram illustrating a configuration of the control computing unit 11. FIG. 14 is a block diagram illustrating a detailed configuration of the target steering reaction force computing unit 11B. As illustrated in FIGS. 13 and 14, the final axial force calculating unit 11Bc reads the feedforward axial force $T_{FF}$ and the feedback axial force $T_{FB}$ from the feedforward axial force calculating unit 11Ba and the feedback axial force calculating unit 11Bb. Subsequently, the final axial force calculating unit 11Bc calculates the steering-rack axial force (final axial force) according to the formula (6) on the basis of the read feedforward axial force $T_{FF}$ and the feedback axial force $T_{FB}$. Then, the final axial force calculating unit 11Bc outputs the calculation result to the axial force-steering reaction force conversion unit 11Bd.

Here, as the method of setting the allocation ratio $G_F$, a method of reading the allocation ratio $G_{F\alpha}$ corresponding to the vehicle speed V from an allocation ratio map M3 to be described later, reading an allocation ratio $G_{F\beta}$ corresponding to the axial force difference from an allocation ratio map M4 to be described later, and setting the multiplied value $G_{F\alpha} \times G_{F\beta}$ thereof as the allocation ratio $G_F$ can be employed. The allocation ratio map M3 is a map in which the allocation ratio $G_{F\alpha}$ corresponding to the vehicle speed V is registered. The axial force difference is a difference between the feedforward axial force $T_{FF}$ and the feedback axial force $T_{FB}$. Specifically, the axial force difference is a subtraction result obtained by subtracting the feedback axial force $T_{FB}$ from the feedforward axial force $T_{FF}$. The allocation ratio map M4 is a map in which the allocation ratio $G_{F\beta}$ corresponding to the axial force difference is registered. Here, the tire characteristics depend on the vehicle speed V. Therefore, in a low-speed range (for example, 0 km/h to 30 km/h) in which the vehicle speed V is low, the input to the steering rack is nonlinear with respect to the steering angle θ or the like, and the estimation accuracy of the feedforward axial force $T_{FF}$ decreases. On the contrary, the estimation accuracy of the feedback axial force $T_{FB}$ is almost constant regardless of the vehicle speed V. Accordingly, the final axial force calculating unit 11Bc according to this embodiment uses the vehicle speed V as an index for setting the allocation ratio $G_{F\beta}$, that is, the allocation ratio $G_F$ of the feedforward axial force $T_{FF}$. Accordingly, the final axial force calculating unit 11Bc according to this embodiment can set a more appropriate allocation ratio $G_F$.

The feedforward axial force $T_{FF}$ is calculated according to the formula (1) derived on the basis of a road surface state or a vehicle state assumed in advance. Therefore, the estimation accuracy of the feedforward axial force $T_{FF}$ decreases when the road surface state or the vehicle state varies. On the contrary, the estimation accuracy of the feedback axial force $T_{FB}$ is almost constant regardless of the road surface state or the vehicle state. Accordingly, the final axial force calculating unit 11Bc according to this embodiment uses the axial force difference, which is a difference between the feedforward axial force $T_{FF}$ and the feedback axial force $T_{FB}$, as an index for setting the allocation ratio $G_{F\beta}$, that is, the allocation ratio $G_F$ of the feedforward axial force $T_{FF}$. Accordingly, the final axial force calculating unit 11Bc according to this embodiment can set a more appropriate allocation ratio $G_F$.

Figure 15:
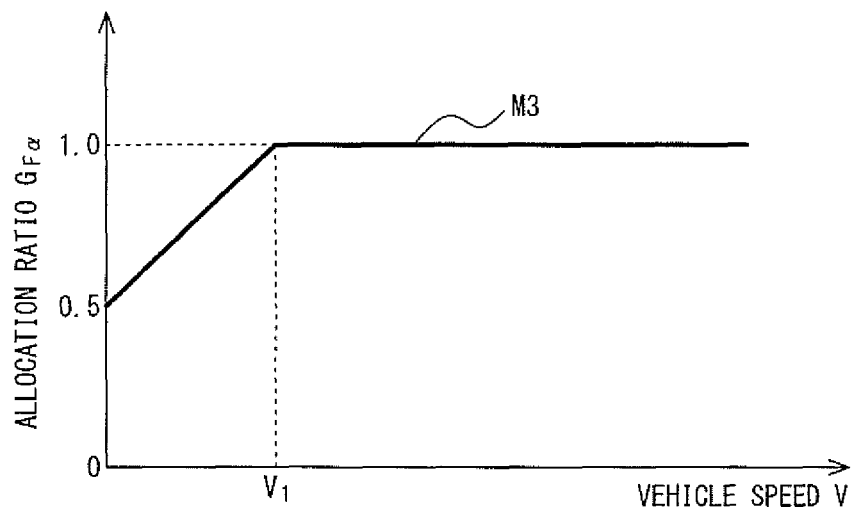
FIG. 15 is a graph illustrating an allocation ratio map M3.

FIG. 15 is a graph illustrating the allocation ratio map M3. As illustrated in FIG. 15, in the allocation ratio map M3, the allocation ratio $G_{F\alpha}$ is set to a value (for example, "1.0") greater than the allocation ratio $(1-G_{F\alpha})$ regardless of the magnitude of the vehicle speed V in a range in which the vehicle speed V is equal to or greater than the first set value $V_1$ (for example, 40 km/h). The first set value $V_1$ is a vehicle speed V (threshold value) at which the nonlinearity (nonlinearity of the tire transverse force Fd with respect to a tire slip angle) of the tire characteristics due to the low vehicle speed V appears and the estimation accuracy of the feedforward axial force $T_{FF}$ starts decreasing.

In the allocation ratio map M3, the allocation ratio $G_{F\alpha}$ is made to linearly increase with an increase of the vehicle speed V in a range in which the vehicle speed V is equal to or greater than 0 and less than the first set value $V_1$. Specifically, in the allocation ratio map M3, the relationship between the vehicle speed V and the allocation ratio $G_{F\alpha}$ is expressed by a linear function in the range in which the vehicle speed V is equal to or greater than 0 and less than the first set value $V_1$. In the linear function, the allocation ratio $G_{F\alpha}$ is calculated to be "0.5" when the vehicle speed V is equal to 0, and the allocation ratio $G_{F\alpha}$ is calculated to be "1.0" when the vehicle speed V is equal to the first set value $V_1$.

Figure 16:
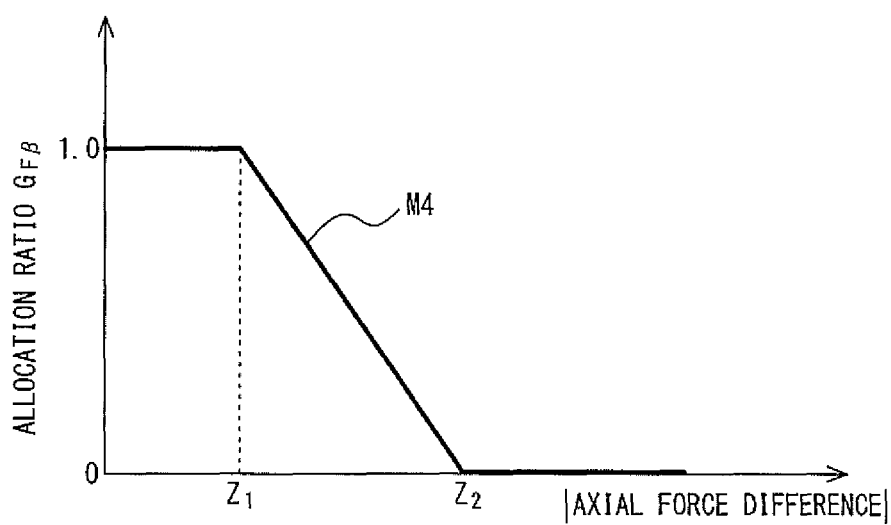
FIG. 16 is a graph illustrating an allocation ratio map M4.

FIG. 16 is a graph illustrating the allocation ratio map M4. As illustrated in FIG. 16, in the allocation ratio map M4, the allocation ratio $G_{F\beta}$ is set to a value (for example, 1.0) greater than the allocation ratio $(1-G_{F\beta})$ regardless of the magnitude of the axial force difference in a range in which the absolute value of the axial force difference is equal to or greater than 0 and less than a first set value $Z_1$ (>0). The first set value $Z_1$ is an axial force difference (threshold value) at which the estimation accuracy of the feedforward axial force $T_{FF}$ starts decreasing.

In the allocation ratio map M4, the allocation ratio $G_{F\beta}$ is set to a value (for example, 0) smaller than the allocation ratio $(1-G_{F\beta})$ regardless of the magnitude of the axial force difference in a range in which the absolute value of the axial force difference is equal to or greater than a second set value $Z_2$ ($>Z_1$). The second set value $Z_2$ is an axial force difference (threshold value) at which the estimation accuracy of the feedforward axial force $T_{FF}$ is lower than the estimation accuracy of the feedback axial force $T_{FB}$.

In the allocation ratio map M4, the allocation ratio $G_{F\beta}$ is made to linearly decrease with an increase of the absolute value of the axial force difference in a range in which the absolute value of the axial force difference is equal to or greater than the first set value $Z_1$ and less than the second set value $Z_2$. Specifically, in the allocation ratio map M4, the relationship between the absolute value of the axial force difference and the allocation ratio $G_{F\beta}$ is expressed by a linear function in the range in which the absolute value of the axial force difference is equal to or greater than the first set value $Z_1$ and less than the second set value $Z_2$. In the linear function, the allocation ratio $G_{F\beta}$ is calculated to be 1.0 when the absolute value of the axial force difference is equal to the first set value $Z_1$, and the allocation ratio $G_{F\beta}$ is calculated to be 0 when the absolute value of the axial force difference is equal to the second set value $Z_2$.

Accordingly, when the vehicle speed V is equal to or greater than 0 and less than the first set value $V_1$ and the absolute value of the axial force difference is equal to or greater than 0 and less than the first set value $Z_1$, the final axial force calculating unit 11Bc calculates the allocation ratio $G_{F\beta}$ to be 1.0. Accordingly, the final axial force calculating unit 11Bc calculates the allocation ratio $G_F$ (=$G_{F\alpha} \times G_{F\beta}$) to be $G_{F\alpha}$ and sets the sum of the value obtained by multiplying the feedforward axial force $T_{FF}$ by the allocation ratio $G_{F\alpha}$ and the value obtained by the feedback axial force $T_{FB}$ by the allocation ratio (1−$G_{F\alpha}$) as the final axial force.

Additionally, when the vehicle speed V is equal to or greater than 0 and less than the first set value $V_1$ and the absolute value of the axial force difference is equal to or greater than the first set value $Z_1$ and less than the second set value $Z_2$, the final axial force calculating unit 11Bc calculates the allocation ratio $G_F$ to be $G_{F\alpha} \times G_{F\beta}$. Accordingly, the final axial force calculating unit 11Bc sets the sum of the value obtained by multiplying the feedforward axial force $T_{FF}$ by the allocation ratio $G_{F\alpha} \times G_{F\beta}$ and the value obtained by the feedback axial force $T_{FB}$ by the allocation ratio (1−$G_{F\alpha} \times G_{F\beta}$) as the final axial force.

Furthermore, when the vehicle speed V is equal to or greater than 0 and less than the first set value $V_1$ and the absolute value of the axial force difference is greater than the second set value $Z_2$, the final axial force calculating unit 11Bc calculates the allocation ratio $G_{F\beta}$ to be 0. Accordingly, the final axial force calculating unit 11Bc calculates the allocation ratio $G_F$ (=$G_{F\alpha} \times G_{F\beta}$) to be 0, calculates the allocation ratio (1−$G_F$) to be 1.0, and sets the feedback axial force $T_{FB}$ as the final axial force.

On the other hand, when the vehicle speed V is equal to or greater than the first set value $V_1$ and the absolute value of the axial force difference is equal to or greater than 0 and less than the first set value $Z_1$, the final axial force calculating unit 11Bc calculates the allocation ratios $G_{F\alpha}$ and $G_{F\beta}$ to be 1.0. Accordingly, the final axial force calculating unit 11Bc calculates the allocation ratio $G_F$ (=$G_{F\alpha} \times G_{F\beta}$) to be 1.0, calculates the allocation ratio (1−$G_F$) to be 0, and sets the feedforward axial force $T_{FF}$ as the final axial force.

Additionally, when the vehicle speed V is equal to or greater than the first set value $V_1$ and the absolute value of the axial force difference is equal to or greater than the first set value $Z_1$ and less than the second set value $Z_2$, the final axial force calculating unit 11Bc calculates the allocation ratio $G_{F\alpha}$ to be 1.0. Accordingly, the final axial force calculating unit 11Bc calculates the allocation ratio $G_F$ (=$G_{F\alpha} \times G_{F\beta}$) to be $G_{F\beta}$ and sets the sum of the value obtained by multiplying the feedforward axial force $T_{FF}$ by the allocation ratio $G_{F\beta}$ and the value obtained by the feedback axial force $T_{FB}$ by the allocation ratio (1−$G_{F\beta}$) as the final axial force.

Furthermore, when the vehicle speed V is equal to or greater than the first set value $V_1$ and the absolute value of the axial force difference is greater than the second set value $Z_2$, the final axial force calculating unit 11Bc calculates the allocation ratio $G_{F\beta}$ to be 0. Accordingly, the final axial force calculating unit 11Bc calculates the allocation ratio $G_F$ (=$G_{F\alpha} \times G_{F\beta}$) to be 0, calculates the allocation ratio (1−$G_F$) to be 1.0, and sets the feedback axial force $T_{FB}$ as the final axial force.

In the final axial force calculating unit 11Bc according to this embodiment, the example where the multiplied value $G_{F\alpha} \times G_{F\beta}$ of the allocation ratio $G_{F\alpha}$ read from the allocation ratio map M3 and the allocation ratio $G_{F\beta}$ read from the allocation ratio map M4 is set as the allocation ratio $G_F$ is described, but other configurations may be employed. For example, a configuration in which the read allocation ratio $G_{F\alpha}$ is set as the allocation ratio $G_F$ may be employed. In the final axial force calculating unit 11Bc according to this embodiment, a configuration in which the allocation ratio maps M1 and M2 according to the respective above-mentioned embodiments are used instead of the allocation ratio map M4 may be employed.

Referring to FIG. 13 again, the target steering angle computing unit 11A calculates the target steering angle θ* which is the target value of the steering angle θ on the basis of the steering wheel angle δ detected by the steering wheel angle sensor 3 and the vehicle speed V detected by the vehicle speed sensor 5. The target steering current computing unit 11C calculates the target steering current on the basis of the subtraction result obtained by subtracting the steering angle θ detected by the steering angle sensor 4 from the target steering angle θ* calculated by the target steering angle computing unit 11A. The target steering current computing unit 11C outputs the calculation result to the steering motor drive unit 8C. The other configurations are the same as the configurations of the above-mentioned embodiments.

The operation of the steering control apparatus of the vehicle A will be described below. It is assumed that a driver starts a stopped vehicle A and slightly steers the steering wheel 1. Then, the control computing unit 11 calculates the target steering angle θ* on the basis of the steering wheel angle δ and the vehicle speed V (the target steering angle computing unit 11A illustrated in FIG. 13). Subsequently, the control computing unit 11 calculates the target steering current on the basis of the subtraction result (θ*−θ) obtained by subtracting the actual steering angle θ from the calculated target steering angle θ* (the target steering current computing unit 11C illustrated in FIG. 13). Accordingly, the steering control unit 8 slightly steers the steered wheels 2 in response to the driver's slight steering operation.

The control computing unit 11 also calculates the feedforward axial force $T_{FF}$ on the basis of the steering wheel angle δ and the vehicle speed V (the feedforward axial force calculating unit 11Ba illustrated in FIG. 14). Subsequently, the control computing unit 11 calculates the transverse-G axial force on the basis of the transverse acceleration Gy (the feedback axial force calculating unit 11Bb illustrated in FIG. 14). Subsequently, the control computing unit 11 calculates the current axial force on the basis of the steering current (the feedback axial force calculating unit 11Bb illustrated in FIG. 14). Subsequently, the control computing unit 11 calculates the yaw-rate axial force on the basis of the yaw rate γ and the vehicle speed V (the feedback axial force calculating unit 11Bb illustrated in FIG. 14). Subsequently, the control computing unit 11 calculates the feedback axial force $T_{FB}$ on the basis of the value obtained by multiplying the calculated current axial force by the allocation ratio $K_2$, the value obtained by multiplying the calculated transverse-G axial force by the allocation ratio $K_1$, and the value obtained by multiplying the calculated yaw-rate axial force by the allocation ratio $K_3$ (the feedback axial force calculating unit 11Bb illustrated in FIG. 14). The allocation ratios $K_1$, $K_2$, and $K_3$ of the transverse-G axial force, the current axial force, and the yaw-rate axial force are set to 0.6:0.3:0.1 (the feedback axial force calculating unit 11Bb illustrated in FIG. 14).

Here, it is assumed that the vehicle speed V is less than the first set value $V_1$ just after the vehicle starts and the absolute value of the axial force difference which is a difference between the feedforward axial force $T_{FF}$ and the feedback axial force $T_{FB}$ is less than the first set value $Z_1$ because the steering angle θ is small. Then, the control computing unit 11 sets the allocation ratio $G_{F\alpha}$ to a numerical value (for example, 0.6), which is equal to or less than 1.0, corresponding to the vehicle speed V according to the allocation ration map M3 illustrated in FIG. 15 (the final axial force calculating unit 11Bc illustrated in FIG. 14). The control computing unit 11 sets the allocation ratio $G_{F\beta}$ to 1.0 according to the allocation ratio map M4 illustrated in FIG. 16 (the final axial force calculating unit 11Bc illustrated in FIG. 14). Accordingly, the allocation ratio $G_F$ (=$G_{F\alpha} \times G_{F\beta}$) is 0.6. Subsequently, the control computing unit 11 allocates the calculated feedforward axial force $T_{FF}$ and the calculated feedback axial force $T_{FB}$ at $G_F$:(1−$G_F$)=0.6:0.4 and calculates the final axial force (the final axial force calculating unit 11Bc illustrated in FIG. 14). Accordingly, the control computing unit 11 sets the sum of the value obtained by multiplying the feedforward axial force $T_{FF}$ by the allocation ratio $G_F$ (=0.6) and the value obtained by multiplying the feedback axial force $T_{FB}$ by the allocation ratio (1−$G_F$) (=0.4) as the increase final axial force. The control computing unit 11 decreases the allocation ratio $G_F$ of the feedforward axial force $T_{FF}$ in the final axial force, that is, the allocation ratio $G_F$ of the estimated value of the steering-rack axial force of which the estimation accuracy decreases due to the nonlinearity of the tire characteristics. Therefore, the final axial force is smooth and reflects the influence of the road surface disturbance while suppressing the decrease of the estimation accuracy.

In this way, in the steering control apparatus according to this embodiment, when the vehicle speed V is less than the first set value $V_1$, that is, when the estimation accuracy of the feedforward axial force $T_{FF}$ decreases due to the nonlinearity of the tire characteristics, and when the absolute value of the axial force difference is less than the first set value $Z_1$, the allocation ratio $G_F$ of the feedforward axial force $T_{FF}$ is made to decrease. Accordingly, in the steering control apparatus according to this embodiment, the final axial force is set to the sum of the value obtained by multiplying the feedforward axial force $T_{FF}$ by the allocation ratio $G_F$ and the value obtained by multiplying the feedback axial force $T_{FB}$ by the allocation ratio (1−$G_F$). Therefore, in the steering control apparatus according to this embodiment, it is possible to smoothly and stably change the final axial force while suppressing the decrease of the estimation accuracy. Accordingly, in the steering control apparatus according to this embodiment, by applying the steering reaction force on the basis of the final axial force, it is possible to improve the estimation accuracy of the final axial force even when the estimation accuracy of the feedforward axial force $T_{FF}$ decreases due to the nonlinearity of the tire characteristics depending on the vehicle speed V. Therefore, in the steering control apparatus according to this embodiment, it is possible to apply a more appropriate steering reaction force by applying the steering reaction force on the basis of the final axial force. Accordingly, in the steering control apparatus according to this embodiment, it is possible to realize a natural feeling of steering even when the vehicle speed V is low.

In the steering control apparatus according to this embodiment, even when the absolute value of the axial force difference is less than the first set value $Z_1$, the feedback axial force $T_{FB}$ is allocated to the final axial force. Accordingly, in the steering control device according to this embodiment, the influence of the road surface disturbance acting on the steered wheels 2 due to the road surface unevenness is mixed into the final axial force. However, in the steering control apparatus according to this embodiment, when the vehicle speed V is low, the road surface disturbance acting on the steered wheels 2 is sufficiently small. Accordingly, in the steering control apparatus according to this embodiment, it is possible to smoothly and stably change the final axial force.

It is assumed that the vehicle A proceeds into a low-ρ road while the control computing unit 11 repeats the flow, the feedback axial force $T_{FB}$ decreases relative to the feedforward axial force $T_{FF}$, and the axial force difference becomes equal to or greater than the first set value $Z_1$. Then, the control computing unit 11 sets the allocation ratio $G_{F\beta}$ to a numerical value (for example, 0.5), which is less than 1.0, corresponding to the axial force difference according to the allocation ration map M4 illustrated in FIG. 16 (the final axial force calculating unit 11Bc illustrated in FIG. 14). Accordingly, the allocation ratio $G_F$ (=$G_{F\alpha} \times G_{F\beta}$) is 0.3. The control computing unit 11 allocates the feedforward axial force $T_{FF}$ and the feedback axial force $T_{FB}$ at $G_F$:(1−$G_F$)=0.3:0.7 and calculates the final axial force (the final axial force calculating unit 11Bc illustrated in FIG. 14). Therefore, when the vehicle speed V is low and the vehicle A proceeds into a low-γ road, it is possible to immediately decrease the allocation ratio $G_F$ of the feedforward axial force $T_{FF}$ and to immediately increase the allocation ratio (1−$G_F$) of the feedback axial force $T_{FB}$. Accordingly, the control computing unit 11 sets the sum of the value obtained by multiplying the feedforward axial force $T_{FF}$ by the allocation ratio $G_F$ (=0.3) and the value obtained by multiplying the feedback axial force $T_{FB}$ by the allocation ratio (1−$G_F$) (=0.7) as the increase final axial force. The control computing unit 11 further decreases the allocation ratio $G_F$ of the feedforward axial force $T_{FF}$ in the final axial force. Therefore, the final axial force is smooth and further reflects the influence of the road surface disturbance while further suppressing the decrease of the estimation accuracy.

In this way, in the steering control apparatus according to this embodiment, when the vehicle speed V is less than the first set value $V_1$, and the absolute value of the axial force difference is equal to or greater than the first set value $Z_1$ (that is, when the estimation accuracy of the feedforward axial force $T_{FF}$ actually decreases), the allocation ratio $G_F$ of the feedforward axial force $T_{FF}$ is made to further decrease. Accordingly, in the steering control apparatus according to this embodiment, it is possible to further improve the estimation accuracy of the final axial force. Therefore, in the steering control apparatus according to this embodiment, it is possible to apply a more appropriate steering reaction force by applying the steering reaction force on the basis of the final axial force.

In this embodiment, the steering wheel 1 illustrated in FIG. 1 corresponds to the steering wheel. Similarly, the steering wheel angle sensor 3 illustrated in FIG. 1 corresponds to the steering wheel angle detecting unit. The steering motor 8A illustrated in FIG. 1 corresponds to the steering motor. The steering motor drive unit 8C and the control computing unit 11 illustrated in FIGS. 1 and 13 and the target steering angle computing unit 11A and the target steering current computing unit 11C illustrated in FIG. 13 correspond to the steering motor drive unit. The vehicle speed V, the transverse acceleration Gy, the yaw rate γ, and the steering current correspond to the state quantity of the vehicle A. The vehicle speed sensor 5, the transverse G sensor 6, the yaw rate sensor 7, and the steering current detecting unit 8B correspond to the state quantity detecting unit. The reaction force motor 9A illustrated in FIG. 1 corresponds to the reaction force motor. The feedforward axial force calculating unit 11Ba illustrated in FIG. 14 corresponds to the feedforward axial force computing unit. The feedback axial force calculating unit 11Bb corresponds to the feedback axial force computing unit. The final axial force calculating unit 11Bc illustrated in FIG. 14 corresponds to the final axial force setting unit. The reaction force motor drive unit 9C illustrated in FIGS. 1 and 13, the target steering reaction force computing unit 11B illustrated in FIG. 13, and the axial force-steering reaction force conversion unit 11Bd and the target reaction force current computing unit 11Be illustrated in FIG. 14 correspond to the reaction force motor drive unit. The vehicle speed sensor 5 illustrated in FIGS. 1 and 13 correspond to the vehicle speed detecting unit.

This embodiment has the following effects in addition to the effects of the above-mentioned embodiments.

(1) The control computing unit 11 allocates the feedback axial force $T_{FB}$ and the feedforward axial force $T_{FF}$ at the set allocation ratios and sets the final axial force which is a steering-rack axial force. At this time, when the vehicle speed V is equal to or greater than the first set value $V_1$, the control computing unit 11 sets the allocation ratio $G_F$ of the feedforward axial force $T_{FF}$ to be smaller than the case where the vehicle speed V is less than the first set value $V_1$. The control computing unit 11 drives the reaction force motor 9A on the basis of the set final axial force. According to this configuration, when the vehicle speed V is low and the estimation accuracy of the feedforward axial force $T_{FF}$ decreases due to the nonlinearity of the tire characteristics, it is possible to increase the allocation ratio of the feedback axial force $T_{FB}$. Accordingly, in the present invention, it is possible to suppress a decrease of the estimation accuracy of the final axial force. Therefore, in the steering control apparatus according to this embodiment, it is possible to apply a more appropriate steering reaction force.

(2) When the vehicle speed V is less than the first set value $V_1$, the final axial force calculating unit 11Bc decreases the allocation ratio $G_F$ of the feedforward axial force $T_{FF}$ corresponding to the degree of increase of the absolute value of the vehicle speed V. According to this configuration, for example, when the vehicle speed V increases and the vehicle speed V gets close to the first set value $V_1$, that is, when the final axial force is switched from the sum of the feedforward axial force $T_{FF}$ and the feedback axial force $T_{FB}$ to the feedback axial force $T_{FB}$, it is possible to gradually increase the allocation ratio of the feedforward axial force $T_{FF}$. Accordingly, it is possible to make the variation of the steering reaction force slow.

(3) When the absolute value of the axial force difference which is a difference between the feedback axial force $T_{FB}$ and the feedforward axial force $T_{FF}$ is equal to or greater than the first set value $Z_1$, the control computing unit 11 sets the allocation ratio $G_F$ of the feedforward axial force $T_{FF}$ to be smaller than the case where the absolute value of the axial force difference is less than the first set value $Z_1$. The control computing unit 11 drives the reaction force motor 9A on the basis of the set final axial force. According to this configuration, when the absolute value of the axial force difference is equal to or greater than the first set value $Z_1$, the allocation ratio $G_F$ of the feedforward axial force $T_{FF}$ is set to be small. Accordingly, for example, when the estimation accuracy of the feedforward axial force $T_{FF}$ decreases and the axial force difference increases, it is possible to increase the allocation ratio $(1-G_F)$ of the feedback axial force $T_{FB}$. Accordingly, in the steering control apparatus according to this embodiment, it is possible to apply a more appropriate steering reaction force.

While the present invention has been described with reference to the definite number of embodiments, the scope of the present invention is not limited thereto and improvements and modifications of the embodiments based on the above disclosure are obvious to those skilled in the art.

The invention claimed is:

1. A steering control apparatus comprising:
a steering wheel mechanically separated from wheels to be steered;
a steering wheel angle detecting unit configured to detect a steering wheel angle of the steering wheel;
a steering motor configured to steer the wheels;
a steering motor drive unit configured to drive the steering motor on the basis of the steering wheel angle detected by the steering wheel angle detecting unit;
a state quantity detecting unit configured to detect a state quantity of a vehicle, the state quantity varying due to a force acting on the wheels in a transverse direction;
a reaction force motor configured to apply a steering reaction force to the steering wheel;
a feedforward axial force computing unit configured to calculate a feedforward axial force on the basis of the steering wheel angle detected by the steering wheel angle detecting unit, the feedforward axial force being a steering-rack axial force;
a feedback axial force computing unit configured to calculate a feedback axial force on the basis of the state quantity of the vehicle detected by the state quantity detecting unit, the feedback axial force being the steering-rack axial force;
a final axial force setting unit configured to allocate the feedback axial force calculated by the feedback axial force computing unit and the feedforward axial force calculated by the feedforward axial force computing unit at an allocation ratio based on an axial force difference which is a difference between the feedback axial force calculated by the feedback axial force computing unit and the feedforward axial force calculated by the feedforward axial force computing unit to set a final axial force as the steering-rack axial force; and
a reaction force motor drive unit configured to drive the reaction force motor on the basis of the final axial force set by the final axial force setting unit.

2. The steering control apparatus according to claim 1, wherein when an absolute value of the axial force difference is equal to or greater than a predetermined set value, the final axial force setting unit sets the allocation ratio of the feedforward axial force to be smaller than a case where the absolute value of the axial force difference is less than the set value.

3. The steering control apparatus according to claim 2, wherein the final axial force setting unit sets the allocation ratio of the feedforward axial force to a predetermined first allocation ratio when the absolute value of the axial force difference is less than a first set value which is the set value, sets the allocation ratio of the feedforward axial force to a second allocation ratio less than the first allocation ratio when the absolute value of the axial force difference is equal to or greater than a second set value greater than the first set value, and sets the allocation ratio of the feedforward axial force to decrease with an increase of the absolute value of the axial force difference when the absolute value of the axial force difference is equal to or greater than the first set value and less than the second set value.

4. The steering control apparatus according to claim 3, wherein when the absolute value of the axial force difference is equal to or greater than the first set value and less than a third set value less than the second set value, the final axial force setting unit sets a degree of decrease of the allocation ratio of the feedforward axial force with respect to a degree of increase of the absolute value of the axial force difference to be smaller than a case where the absolute value of the axial force difference is equal to or greater than the third set value and less than the second set value.

5. The steering control apparatus according to claim 3, further comprising a vehicle speed detecting unit configured to detect a vehicle speed of the vehicle,
wherein when the vehicle speed is less than a predetermined vehicle speed threshold value, the final axial force setting unit sets the first set value to be greater and sets a degree of decrease of the allocation ratio of the feedforward axial force with respect to a degree of increase of the absolute value of the axial force difference to be smaller than a case where the vehicle speed is equal to or greater than the vehicle speed threshold value.

6. The steering control apparatus according to claim 3, further comprising a steering wheel angular velocity detecting unit configured to detect a steering wheel angular velocity of the steering wheel,
wherein when the steering wheel angular velocity is equal to or greater than a predetermined angular velocity threshold value, the final axial force setting unit sets a degree of decrease of the allocation ratio of the feedforward axial force with respect to a degree of increase of the absolute value of the axial force difference to be smaller than a case where the steering wheel angular velocity is less than the angular velocity threshold value.

7. The steering control apparatus according to claim 3, wherein the axial force difference is a value obtained by subtracting the feedback axial force calculated by the feedback axial force computing unit from the feedforward axial force calculated by the feedforward axial force computing unit,
wherein when the axial force difference is a negative value, the final axial force setting unit sets a degree of decrease of the allocation ratio of the feedforward axial force with respect to a degree of increase of the absolute value of the axial force difference to be smaller than a case where the axial force difference is a positive value.

8. The steering control apparatus according to claim 1, further comprising a vehicle speed detecting unit configured to detect a vehicle speed of the vehicle,
wherein when the vehicle speed detected by the vehicle speed detecting unit is less than a predetermined vehicle speed set value, the final axial force setting unit sets the allocation ratio of the feedforward axial force to be smaller than a case where the vehicle speed is equal to or greater than the vehicle speed set value.

9. The steering control apparatus according to claim 8, wherein when the vehicle speed detected by the vehicle speed detecting unit is less than the vehicle speed set value, the final axial force setting unit sets the allocation ratio of the feedforward axial force to increase with an increase of the vehicle speed.

10. A steering control apparatus comprising:
a steering wheel angle detecting means for detecting a steering wheel angle of a steering wheel mechanically separated from wheels to be steered;
a steering motor drive means for driving a steering motor on the basis of the steering wheel angle detected by the steering wheel angle detecting means, the steering motor being configured to steer the wheels;
a state quantity detecting means for detecting a state quantity of a vehicle, the state quantity varying due to a force acting on the wheels in a transverse direction;
a feedforward axial force calculating means for calculating a feedforward axial force on the basis of the steering wheel angle detected by the steering wheel angle detecting means, the feedforward axial force being a steering-rack axial force;
a feedback axial force calculating means for calculating a feedback axial force on the basis of the state quantity of the vehicle detected by the state quantity detecting means, the feedback axial force being the steering-rack axial force;
an axial force allocation means for allocating the feedback axial force calculated by the feedback axial force calculating means the and the feedforward axial force calculated by the feedforward axial force calculating means at an allocation ratio based on an axial force difference which is a difference between the feedback axial force calculated by the feedback axial force calculating means and the feedforward axial force calculated by the feedforward axial force calculating means to set a final axial force as the steering-rack axial force; and
a reaction force motor drive means for driving a reaction force motor on the basis of the final axial force set by the axial force allocation means, the reaction force motor being configured to apply a steering reaction force to the steering wheel.

11. A steering control method comprising:
detecting a steering wheel angle of a steering wheel mechanically separated from wheels to be steered using a steering wheel angle sensor;
driving a steering motor on the basis of the detected steering wheel angle, the steering motor being configured to steer the wheels;
detecting a state quantity of a vehicle, the state quantity varying due to a force acting on the wheels in a transverse direction;
calculating a feedforward axial force on the basis of the detected steering wheel angle, the feedforward axial force being a steering-rack axial force;
calculating a feedback axial force on the basis of the detected state quantity of the vehicle, the feedback axial force being the steering-rack axial force;
allocating the calculated feedback axial force and the calculated feedforward axial force at an allocation ratio based on an axial force difference which is a difference between the calculated feedback axial force and the calculated feedforward axial force to set a final axial force as the steering-rack axial force; and
driving a reaction force motor on the basis of the set final axial force, the reaction force motor being configured to apply a steering reaction force to the steering wheel.

* * * * *